United States Patent
Barroux

(10) Patent No.: US 6,220,768 B1
(45) Date of Patent: Apr. 24, 2001

(54) NETWORK ASSET SURVEY TOOL FOR GATHERING DATA ABOUT NODE EQUIPMENT

(75) Inventor: Juan Carlos Barroux, San Jose, CA (US)

(73) Assignee: Sun Microsystems, Inc., Mountain View, CA (US)

( * ) Notice: Subject to any disclaimer, the term of this patent is extended or adjusted under 35 U.S.C. 154(b) by 0 days.

(21) Appl. No.: 08/671,107

(22) Filed: Jun. 28, 1996

(51) Int. Cl.$^7$ .................................................... G06F 13/00
(52) U.S. Cl. ............................................................ 395/200.54
(58) Field of Search ........................ 395/200.53, 200.54, 395/835, 836

(56) References Cited

U.S. PATENT DOCUMENTS

| | | | |
|---|---|---|---|
| 5,185,860 | * 2/1993 | Wu | 395/200.54 |
| 5,282,270 | * 1/1994 | Oppenheiner et al. | 395/200.53 |
| 5,596,723 | * 1/1997 | Romohr | 395/200.52 |
| 5,651,006 | * 7/1997 | Fujino et al. | 370/408 |

OTHER PUBLICATIONS

A press released issued on Dec. 4, 1994, by SunService, a division of Sun Microsystems, indicating availability of an asset survey reporitng service taking advantage of asset survey software.

Case, J., et al., "A Simple Network Management Protocol; RFC 1157" *Internet Request for Comments*, No. 1157, May 1990.

McCloghrie, K., "Management Information Base for Network Management of TCP/IP–based internets; RFC 1156" *Internet Request for Comments*, No. 1156, May 1990.

* cited by examiner

*Primary Examiner*—Lance Leonard Barry

(57) ABSTRACT

An efficient asset survey tool is disclosed. For networks having 3,000 nodes, equipment and configuration information may be collected in a few hours, even with no previous information collection. Certain implementations exploit services available at the nodes including TCP/IP related applications and remotely executable configuration information commands. The asset survey tool may be operated as a stand-alone tool or as an automatically invoked component of a more complete asset database management system. In a preferred embodiment, the asset survey tool operates non-intrusively with no need for installation of special software at surveyed systems.

18 Claims, 18 Drawing Sheets

650

Service Activation Type

652

☐ Discovery
☐ Auto Install
☐ SNMP Probe
☐ RPC Probe Hardware Agent
☐ RPC Probe Software Agent
☐ RPC Probe Asset Table Agent System Table

700

| 702 | 704 | 706 | 708 | 710 | 712 | 714 | 716 |
|---|---|---|---|---|---|---|---|
| AALID | CID | Version | Configuration | FUD | LUD | FUN | LUN |
| | | | | $T_1$ | $T_N$ | $N_1$ | $N_N$ |

Processors Table (720)

| CID (704) | PathTo (722) | Configuration (724) | FUD (710) | LUD (712) | FUN (714) | LUN (716) |
|---|---|---|---|---|---|---|
|  |  |  |  |  |  |  |

*FIG. 7B*

Software Package Table (726)

| CID (704) | Instance (728) | Name (730) | Configuration (732) | FUD (710) | LUD (712) | FUN (714) | LUN (716) |
|---|---|---|---|---|---|---|---|
|  |  |  |  |  |  |  |  |

*FIG. 7C*

Patches Table (734)

| CID (704) | Patch ID (736) | Package name (738) | FUD (710) | LUD (712) | FUN (714) | LUN (716) |
|---|---|---|---|---|---|---|
|  |  |  |  |  |  |  |

*FIG. 7D*

NETWORK ASSET SURVEY TOOL FOR GATHERING DATA ABOUT NODE EQUIPMENT

STATEMENT OF RELATED APPLICATIONS

The present application is related to the subject matter of the following applications:

U.S. patent application Ser. No. 08/670,835, filed Jun. 28, 1996, entitled "REMOTE HETEROGENEOUS SOFTWARE INSTALLATION" and having J. C. Barroux as inventor;

U.S. patent application Ser. No. 08/671,108, filed Jun. 28, 1996, entitled "NETWORK TASKS SCHEDULING" and having J. C. Barroux as inventor; and U.S. patent application Ser. No. 08/672,640, filed Jun. 28, 1996, entitled "HISTORICAL ASSET INFORMATION DATA STORAGE SCHEMA" and having J. C. Barroux as inventor, all of which were filed on the same day as the present application and have the same assignee. These related applications are expressly incorporated herein by reference for all purposes.

BACKGROUND OF THE INVENTION

Embodiments of the present invention relate to network asset management and to method and apparatus for automatically surveying a network.

The development of so-called intranets, e.g., private networks operated typically using the TCP/IP protocol suite creates problems of management and administration. System administrators need to know what equipment is connected to the network and its configuration. The information is necessary for user support, network planning, corporate financial statements, software purchasing etc.

However, many intranets include thousands of nodes. Thus, surveying the network manually is a lengthy process. First, the physical location of each node must be known. Often, even this information is difficult to obtain and maintain since extensions to a network may be made without notifying the system administrator. Then, the system administrator (or a surrogate) must visit each and every node. For each node, he or she records the equipment there. To learn which operating system is installed, the MAC address, the amount of RAM, the node name, the host ID, and other configuration information, he or she must operate the system.

The survey process is thus quite cumbersome and may take several weeks, by which time the information collected early in the process may well be partially obsolete. Furthermore, the survey process requires skilled labor, otherwise available for other network administration tasks.

A network management protocol known as SNMP exists for providing external access to network management information resident at a network node. However, its primary application has been monitoring network performance rather than asset surveying.

SUMMARY OF THE INVENTION

An efficient asset discovery system is provided by one embodiment of the present invention. For networks having 3,000 nodes, equipment and configuration information may be collected in a few hours, even with no previous information collection. Certain implementations exploit services available at the nodes including TCP/IP related applications and remotely executable configuration information commands. The asset discovery system may be operated as a stand-alone tool or as an automatically invoked component of a more complete asset database management system. In a preferred embodiment, the asset discovery system operates non-intrusively with no need for installation of special software at surveyed systems. Furthermore, the asset discovery system need not write information to disk storage at the surveyed systems.

One aspect of the invention takes advantage of SNMP (Simple Network Management Protocol) to collect survey information for a TCP/IP network. SNMP provides that an MIB (Management Information Base) is maintained at most nodes operating TCP/IP. The MIB includes management objects, one or more of which include information identifying node equipment and configuration. In accordance with the invention, an asset discovery system may invoke SNMP to poll available MIBs in a TCP/IP network. The asset discovery system then extracts the node equipment configuration information from the responses and stores it to develop an asset configuration database.

In one embodiment, a method for surveying a network includes steps of: 1) sending a plurality of SNMP variable value requests via the network, each of the plurality of requests addressed to a different address in a range of address space; 2) receiving a plurality of replies to the plurality of requests, each of the replies originating from a different address in the range; extracting information from each of the replies, the information characterizing assets at the nodes receiving the plurality of messages and generating the replies; and 3) developing from the extracted information an asset database characterizing a current configuration of assets at the nodes generating the replies.

A further understanding of the nature and advantages of the inventions herein may be realized by reference to the remaining portions of the specification and the attached drawings.

BRIEF DESCRIPTION OF THE DRAWINGS

FIGS. 6A–6D depict windows for entering survey task schedule information in accordance with one embodiment of the present invention.

FIGS. 7A–7D depict a database of network management information in accordance with one aspect of the present invention.

FIG. 9 depicts a representation of the validity periods for configuration information stored in the tables of an asset database.

FIG. 16 depicts a flowchart describing steps of surveying a network in accordance with one embodiment of the present invention.

DESCRIPTION OF SPECIFIC EMBODIMENTS

General Architecture

Figure 1:
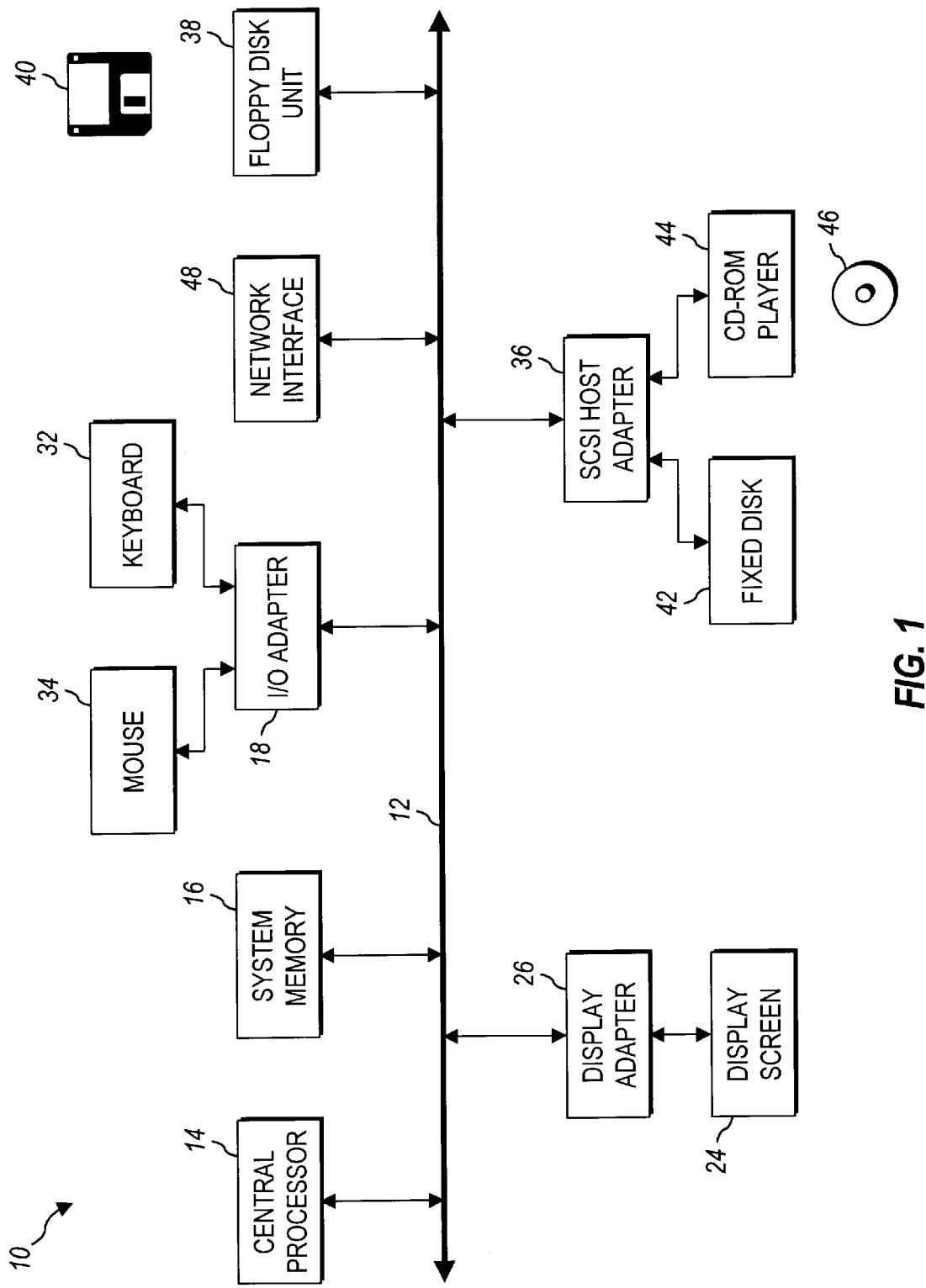
FIG. 1 depicts a block diagram of a host computer system 10 suitable for implementing the present invention or being connected in a network implementing the present invention.

Host computer system 10 includes a bus 12 which interconnects major subsystems such as a central processor 14, a system memory 16 (typically RAM), an input/output (I/O) adapter 18, an external device such as a display screen 24 via display adapter 26, a keyboard 32 and a mouse 34 via I/O adapter 18, a SCSI host adapter 36, and a floppy disk drive 38 operative to receive a floppy disk 40. SCSI host adapter 36 may act as a storage interface to a fixed disk drive 42 or a CD-ROM player 44 operative to receive a CD-ROM 46. Fixed disk 42 may be a part of host computer system 10 or may be separate and accessed through other interface systems. A network interface 48 may provide a connection to a LAN, to a TCP/IP based intranet or to the Internet itself. Many other devices or subsystems (not shown) may be connected in a similar manner.

Also, it is not necessary for all of the devices shown in FIG. 1 to be present to practice the present invention, as discussed below. The devices and subsystems may be interconnected in different ways from that shown in FIG. 1. The operation of a computer system such as that shown in FIG. 1 is readily known in the art and is not discussed in detail in this application. Code to implement the present invention, may be operably disposed or stored in computer-readable storage media such as system memory 16, fixed disk 42, CD-ROM 46, or floppy disk 40.

Figure 2:
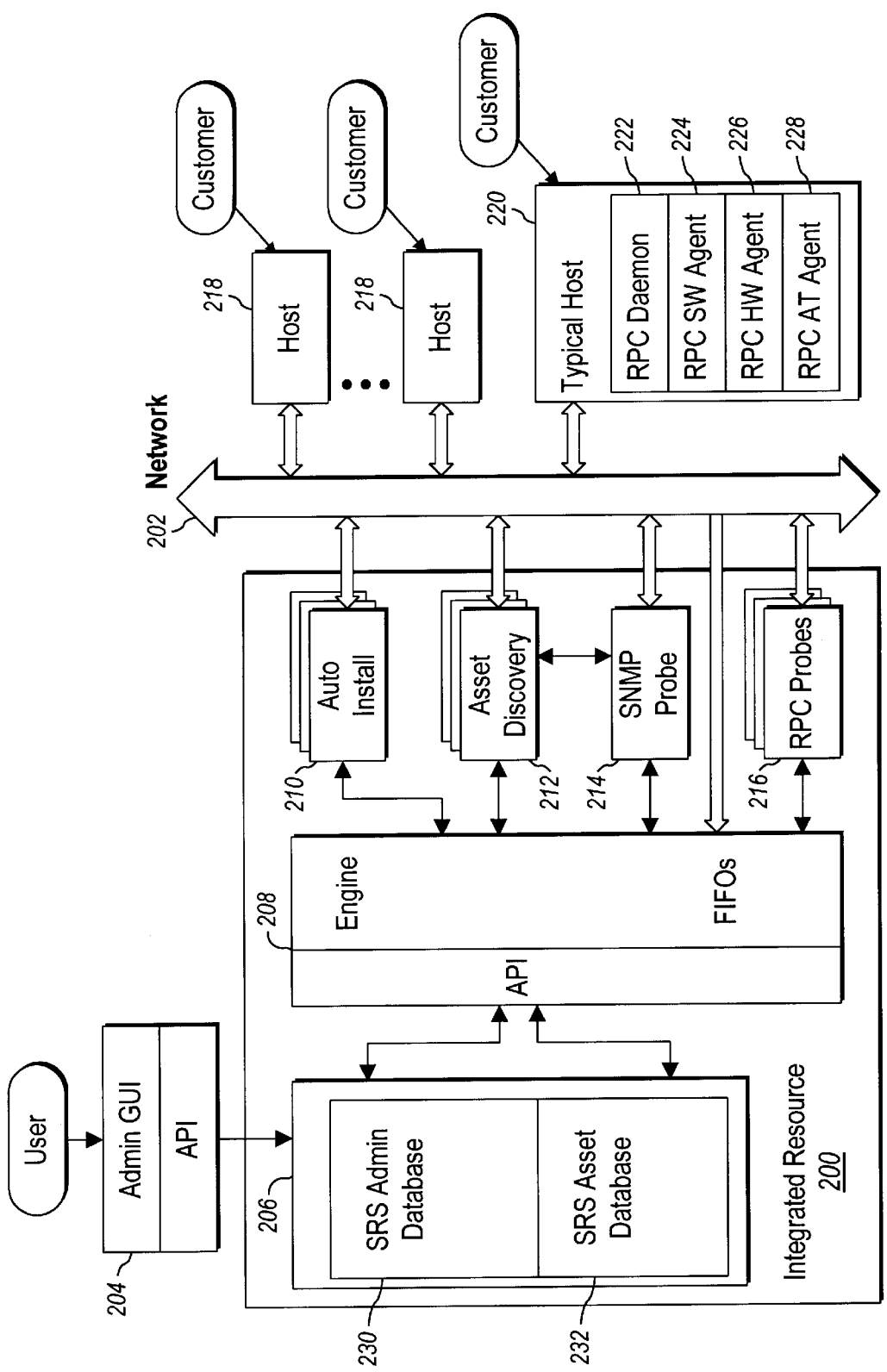
FIG. 2 depicts an integrated resource for collecting and managing survey information about a network in accordance with one embodiment of the present invention.

FIG. 2 depicts an integrated resource 200 for collecting and managing survey information about a network 202 in accordance with one embodiment of the present invention. Integrated resource 200 may be implemented on a host system connected in network 202 such as computer system 10. Integrated resource 200 is accessed by the user via a graphical user interface (GUI) 204 running on computer system 10. Integrated resource 200 includes an Embedded Database System (EDS) 206, an integrated resource engine 208, an auto-installation system 210, an asset discovery system 212, an SNMP probe system 214, and an RPC (remote procedure call) probe system 216. Integrated resource 200 interacts via network 202 with other network hosts 218. A representative network host 220 is shown as including an RPC daemon 222, an RPC software agent 224, an RPC hardware agent 226, and an RPC AT (Asset Table) agent 228.

Integrated resource 200 is a tool for collecting and managing survey information about nodes of network 202. Asset discovery system 212 takes advantage of various TCP/IP services and remote execution of commonly installed procedures to automatically learn about nodes of network 202. SNMP probe system 214 makes us of SNMP management agents resident on nodes 218 to collect further information. Auto-installation system 210 installs RPC agents on hosts 218 to facilitate collection of more detailed information about the configuration of individual nodes. Once these agents are installed, RPC probe system 216 invokes the agents to collect the detailed configuration information.

Many of the components of integrated resource 200 as well as the GUI 204 also have independent application. For instance a simple surveying capability may be provided with the use of asset discovery system 212 alone, or asset discovery system 212 in combination with SNMP probe system 214. Auto-installation system 210 provides remote installation capabilities useful for all types of software and not just software directed towards network surveying and management. Similarly, GUI 204 incorporates network control functionality useful outside the surveying field.

EDS 206 includes an administrative database 230 and an asset database 232. Administrative database 230 stores data that defines discovery tasks performed by integrated resource 200 on network 202. Each task identifies a probe mechanism, an IP address (for IP networks), and a time to execute the task. Upon initialization, integrated resource 200 queries this database and computes a schedule of tasks to be executed. Integrated resource 200 also computes whether tasks need to be repeated, and builds an interval schedule for tasks requiring repetition into its schedule. Integrated resource 200 also reads administrative database 230 to determine when and where to invoke auto-installation system 210 to install RPC agents on nodes of network 204.

Integrated resource 200 collects and analyzes information about nodes of network 202 and returns that information to asset database 232. Asset database 232 may then serve as a basis for more detailed report generation.

Integrated resource 200 is a task-driven tool. Each asset query it makes to network 202 is a separate task. Each response it receives back from a node is a separate data item. The schedule of tasks to be performed is derived from user input via GUI 204.

Figure 3:
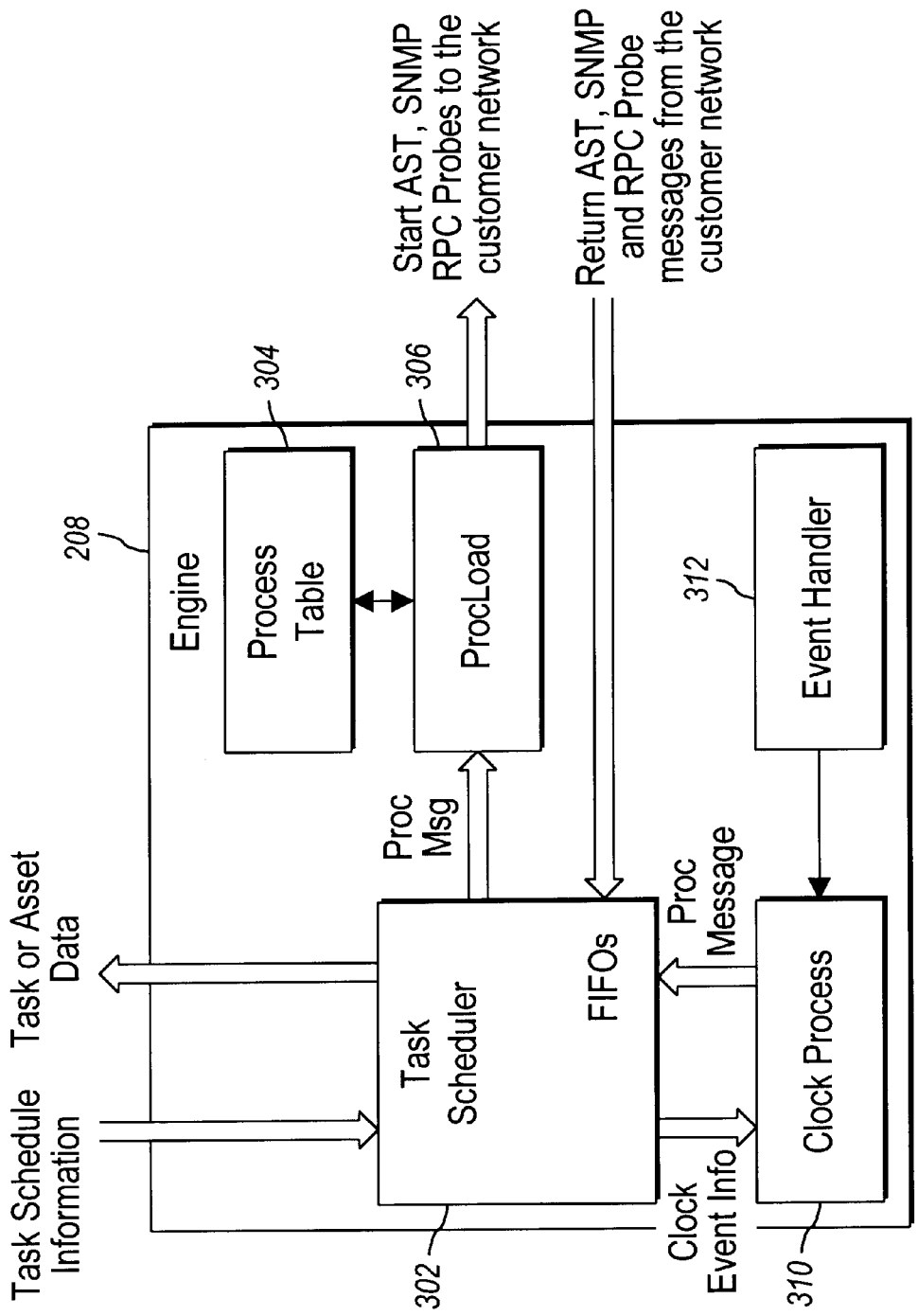
FIG. 3 depicts a resource engine of the integrated resource of FIG. 2 in accordance with one embodiment of the present invention.

FIG. 3 depicts resource engine 208 in accordance with one embodiment of the present invention. Resource engine 208 includes a task scheduler 302, a process table 304, a ProcLoad (process loader) module 306, a clock process 310, and an event handler 312. Event handler 312 sends a Clock Timer message to clock process 310 every sixty seconds. Clock process 310 maintains a list of tasks to be performed by integrated resource 200. It places these tasks into a linked list, sorted by time. It tracks elapsed time provided from event handler 312 and dispatches tasks to task scheduler 302 according to elapsed time. Task scheduler 302 builds the schedule of tasks maintained by clock process 310 as explained with reference to FIG. 4. Task scheduler 302 compares received tasks from clock process 310 to negative schedule information (times when tasks are not to be performed) from administrative database 230. If a task is received and does not have associated negative schedule information, the task is issued to ProcLoad module 306 for launching. Task scheduler 302 writes incoming collected data to asset database 232. ProcLoad module 306 invokes auto-installation system 210, asset discovery system 212, SNMP probe system 214, and RPC probe system 216 in response to the tasks received from task scheduler 302. ProcLoad module 306 further maintains process table 304. This is a table kept in shared memory with an entry for every process ProcLoad module 306 is managing. It includes the administrative information for each of the processes.

Network Tasks Scheduling

In accordance with one aspect of the present invention, GUI 204 permits an operator of integrated resource 200 to control the scheduling of survey tasks across network 202 at any hierarchical level. Typically, network 202 includes three levels of hierarchy, the network itself, a plurality of subnets, and nodes of each subnet. An important capability of integrated resource 200 is periodic scheduling of survey tasks. In this way survey information stored in asset database 302 is kept current. Furthermore, repeated performance of survey tasks increases the probability that a host at a particular node will eventually by powered on and available for surveying.

However, the network, each subnet, or even each node may have special characteristics that create scheduling constraints. A particular subnet or node may have periodic peaks in network traffic. For example, if network 202 connects stores of a retail chain, a traffic peak may occur at closing time as financial information incorporating the day's results is forwarded across the network. If network 202 is the internal network of a large corporation, a subnet assigned to the accounting department may experience heavy loads every week on payday. Alternatively, this traffic peak may be limited to particular identified nodes. The operator of integrated resource 200 will want to assure that surveying activities do not contend with normal network business during these peak periods. On the other hand, other periods may be ideal for surveying, but again these period may vary throughout the network. As can be seen, the scheduling for a large network may be complex.

GUI 204 provides a simple yet powerful solution to the problem of constructing a task schedule for a large network. Each network entity, whether it be the network itself, a subnet, or an individual node has associated with it a group of scheduling information parameters. Each scheduling information parameter corresponds to a repetition interval for a particular task. For instance, one scheduling information parameter may correspond to surveying a particular subnet using SNMP probe system 214 every three hours. Each scheduling information parameter may be specified with a particular repetition interval or left unspecified. The repetition interval is preferably specified in minutes. Furthermore, the operator may specify for each network entity one or more exclusion periods, periods during which surveying tasks should not be performed. Preferably, GUI 204 provides windows to set the repetition intervals and exclusion periods for each network entity.

In the preferred embodiment, repetition intervals are inherited from a higher level in the hierarchy. If no repetition interval is specified for a particular node, the repetition interval specified for the node's subnet governs frequency of task performance for that node. If the subnet interval has not been specified, the network repetition interval governs. On the other hand, a repetition interval specified at the node level governs for that node even if a different interval has been specified at the subnet or network level. Similarly, if no node repetition interval has been specified, the repetition period for the subnet governs even if a different interval has been specified at the network level.

Another aspect of task scheduling is selecting which tasks are to be run on which nodes. The tasks which may be run preferably include auto-installation tasks, SNMP probe tasks, discovery tasks, RPC hardware probe tasks, RPC software probe tasks, and RPC asset table tasks. Each network entity has associated input parameters for each task type. These parameters may either be positive or negative but the default values are positive. A selected task is performed for a target node only if the relevant input parameter for the target node, the relevant input parameter for the subnet to which the particular node belongs, and the relevant input parameter for the network as a whole are all positive. Thus, a negative value for a task type input parameter can be understood as being inherited from the network level to the subnet level, and from the subnet level to the node level.

Figure 4:
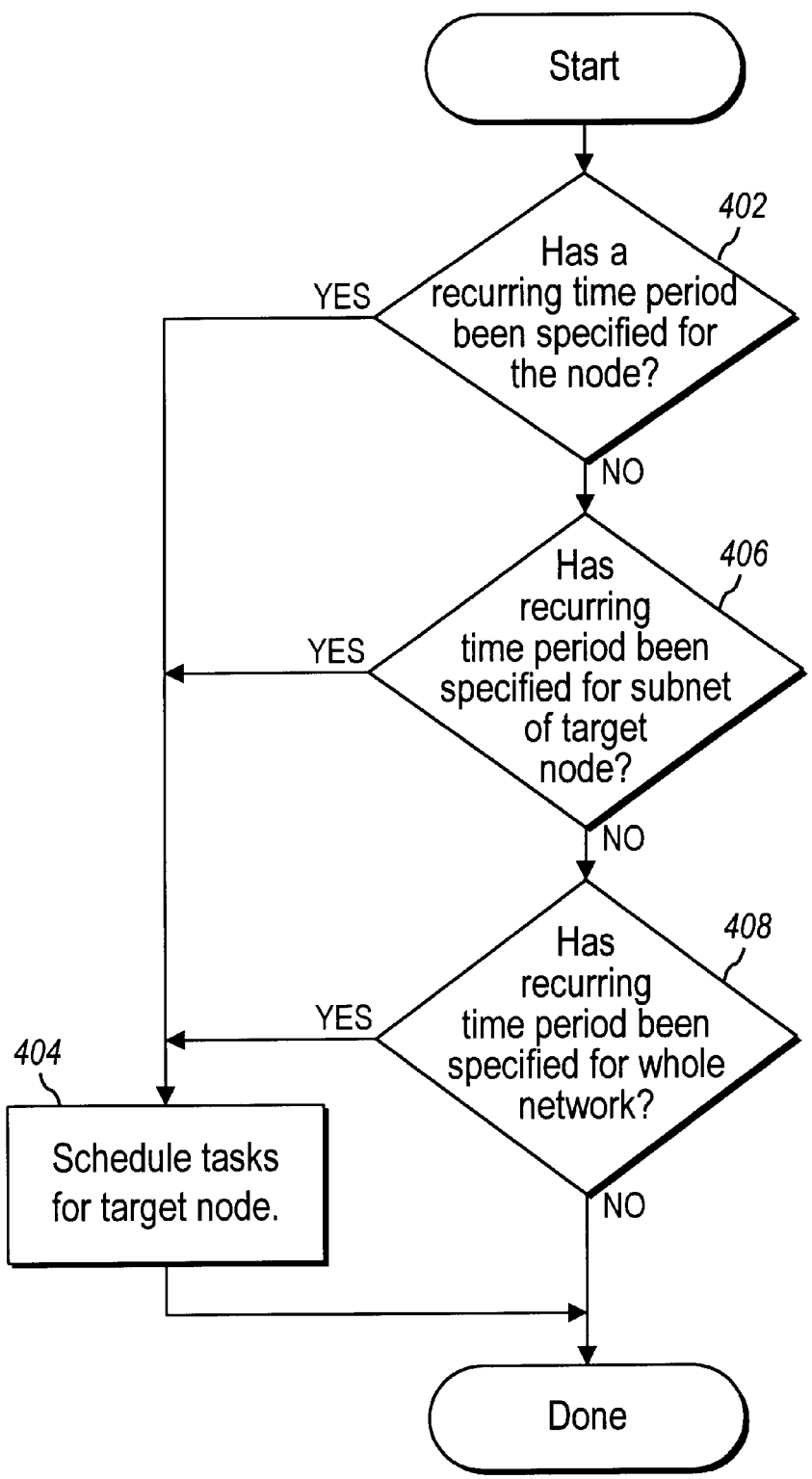
FIG. 4 is a flowchart describing steps of preprocessing scheduling information input for a given day and a given target node in accordance with one embodiment of the present information.

FIG. 4 is a flowchart describing steps of preprocessing scheduling information input for a given target node and a given task as performed by task scheduler 302 in accordance with one embodiment of the present information. At step 402, task scheduler 302 determines by reference to administrative database 230 whether a repetition period has been specified for a given node. If a repetition period has been specified for the target node, task scheduler 302 schedules the selected task for the target node at step 404 with the specified repetition period. If no repetition period has been specified, then task scheduler 302 proceeds to step 406 where it checks if a repetition period has been specified for the subnet to which the target node belongs. If this subnet repetition period has been specified, then task scheduler 302 schedules the selected task for the target node at step 404 in accordance with the subnet repetition period. If this subnet repetition period has also been left unspecified, then task scheduler 302 proceeds to step 408 where it checks if a repetition period for the whole network has been specified. If only this network repetition period has been specified, then task scheduler 302 schedules the selected task for the target node at step 404.

Figure 5:
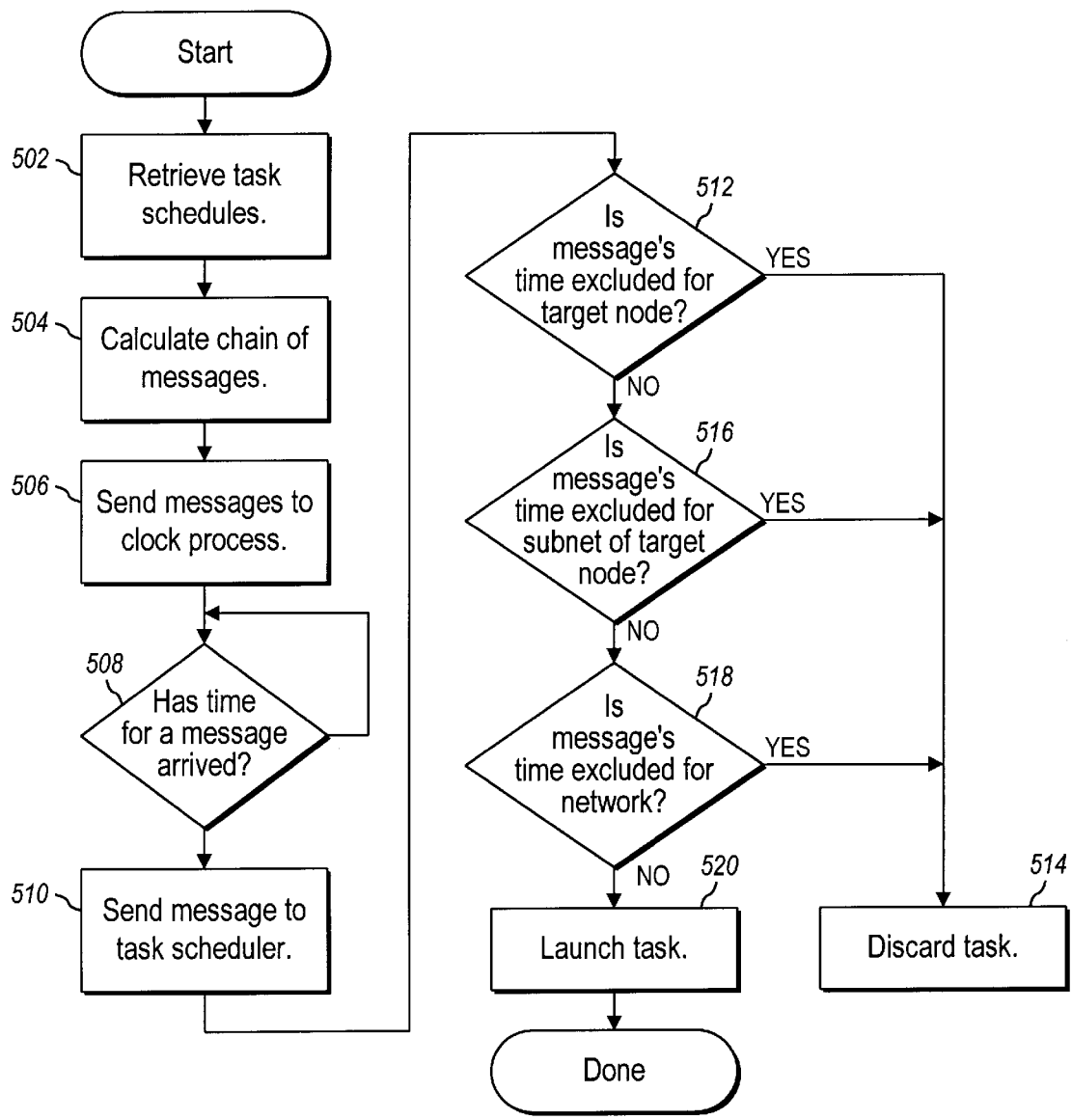
FIG. 5 is a flowchart describing steps of performing tasks according to a schedule in accordance with one embodiment of the present invention.

FIG. 5 is a flowchart describing steps of performing tasks according to a schedule in accordance with one embodiment of the present invention. At step 502, upon initialization of integrated resource 200, task scheduler 302 retrieves the task schedules developed according to FIG. 4. At step 504, task scheduler 302 calculates a chain of messages, each message containing a time, an IP address of a target node, and a task to perform for that target node. At step 506, task scheduler 302 sends these messages to clock process 310.

Clock process 310 manages these messages in a linked list ordered by time. At step 508, clock process 310 determines if a time for any message has arrived as determined by tracking messages from event handler 312. Clock process 310 continues to wait at step 508 if such a time has not arrived. Once a message's time does arrive, clock process 310 sends the message to task scheduler 302 at step 510.

Upon receiving the message, task scheduler 302 checks the time against the exclusion periods for the target node at step 512. If the message's time is excluded, task scheduler 302 discards the message at step 514. If the message's time is not excluded for the target node, task scheduler 302 proceeds to step 516 where exclusion periods for the subnet to which the target node belongs are checked. If the message's time is excluded for the subnet, task scheduler 302 discards the message at step 514. If the message's time is not excluded, task scheduler 302 proceeds to step 518 where exclusion periods specified for the whole network are checked. If the message's time is excluded for the whole network, again task scheduler 302 discards the message at step 514. If the message's time is not excluded at any level, at step 520 it passes to ProcLoad module 306 for launching of the task identified in the message.

For tasks to be performed by asset discovery system 212, exclusion periods and repetition periods are specified for the network and subnet level but not for each node. Asset discovery system 212 receives instructions for an entire subnet and not for individual nodes.

In accordance with one embodiment of the present invention, all exclusion times are processed in terms of the target node's local time zone. This greatly eases the scheduling of tasks across a network that spans multiple time zones since busy periods are normally most readily determined in terms of a local time period.

FIGS. 6A–6D depict windows for entering survey task schedule information in accordance with one embodiment of the present invention. The depicted windows are for entering survey task schedule information for a particular subnet but the windows corresponding to a particular node or the network as a whole are essentially similar.

Figure 6A:
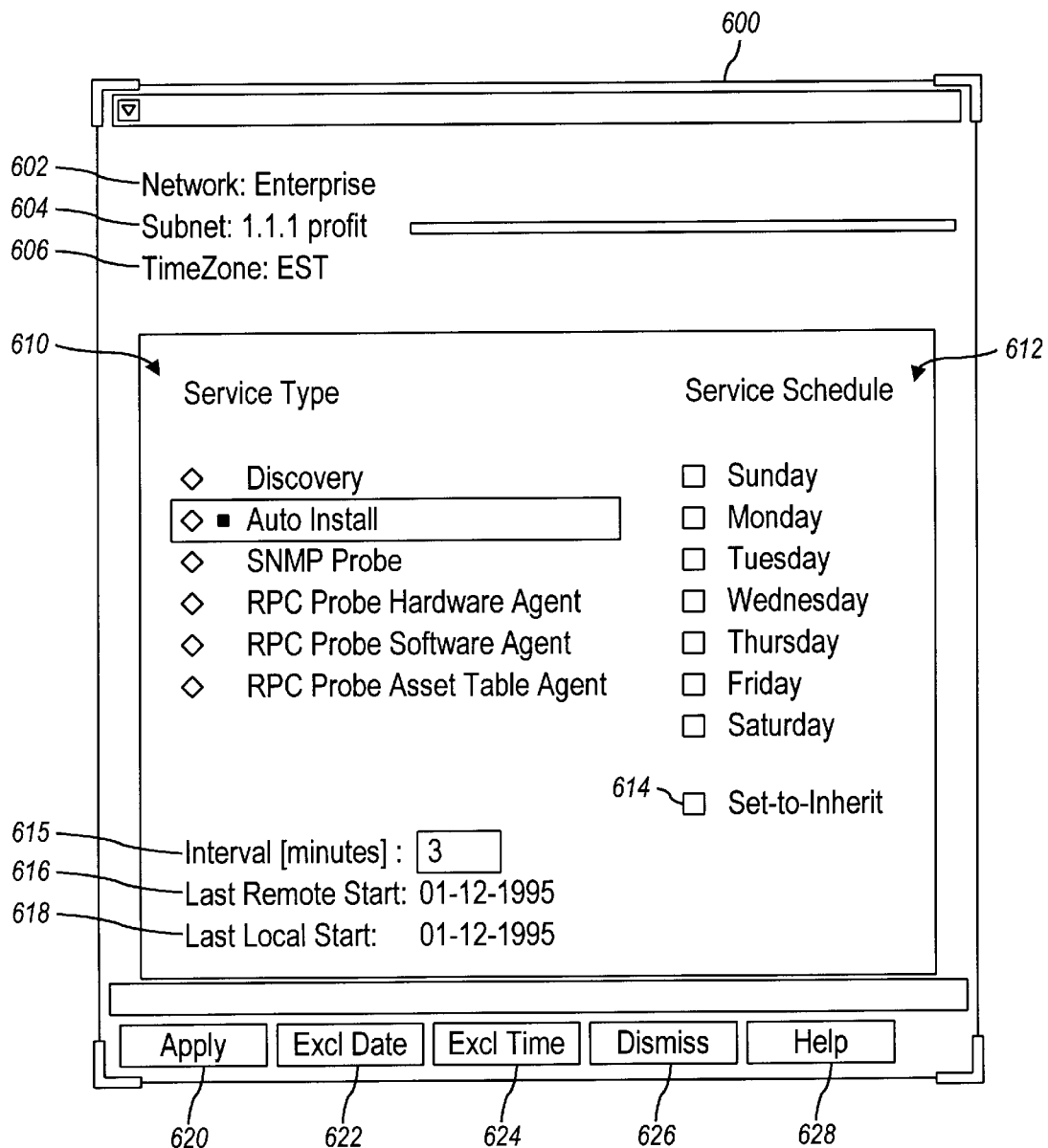

FIG. 6A depicts a scheduling information window 600 for a subnet in accordance with one embodiment of the present invention. An uneditable network field 602 reports a previously specified network name. An uneditable subnet field 604 reports a previously specified subnet name and address. An uneditable time zone field 606 reports a previously specified time zone.

Service type checkboxes 610 correspond to the tasks for which the user may create a schedule. By checking a box, the operator requests display of scheduling parameters for the selected task. Checkboxes are provided for discovery as performed by asset discovery system 212, for auto-installation as performed by auto-installation system 210, and for various RPC functions performed by RPC probe system 216. The checkboxes are exclusive, only one may be selected at any one time.

Service schedule checkboxes 612 permit the operator to specify an exclusion period for one or more days of the week. When a checkbox for a day is marked as selected, the currently selected task may be performed on that day. When the checkbox is unmarked, the currently selected task is excluded from being performed on that day. A time interval box 615 allows entry of a repetition interval for the identified survey tasks. When the service schedule checkboxes 612 are initially displayed for a selected task, an unmarked state will be inherited from the network level while the remaining checkboxes will be marked as a default. When time interval box 615 is initially displayed, it will show the value inherited from the network level for the selected task. Similarly, the scheduling information window for a node (not shown) will initially show the values inherited from the subnet window. A set-to-inherit box 614 acts as a reset and causes the values to again be inherited even after selections have been made.

An uneditable last remote start field 616 reports a last time that a node on this subnet was surveyed with the selected task with the time given in the time zone of the subnet. An uneditable last local start field 618 reports the same time but in the time zone of the system running integrated resource 200.

An apply button 620 writes the changes made in this window to administrative database 230. Activation of an exclusive dates window button 622 causes display of an exclusive dates window described with reference to FIG. 6B. Activation of an exclusive time window button 624 similarly causes display of an exclusive time window described with reference to FIG. 6C. Activation of a dismiss button 626 dismisses this window and all child windows opened from it. Activation of a help button 628 results in display of help information for window 600.

Figure 6B:
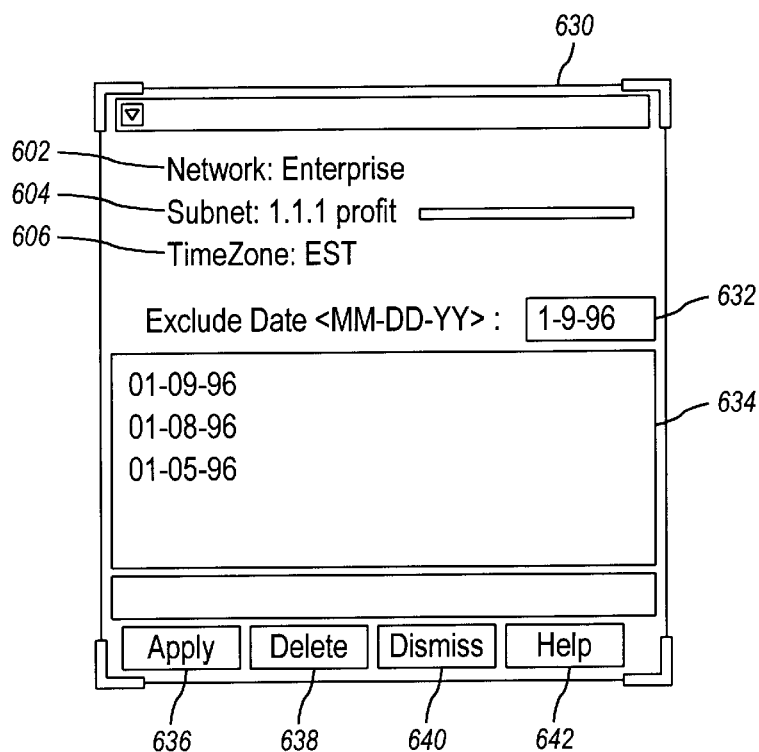

FIG. 6B depicts an exclusion dates window 630 corresponding to a particular subnet in accordance with one embodiment of the present invention. Uneditable fields 602, 604, and 606 serve the same functions as the identically designated fields in FIG. 6A. An exclusion date entry field 632 permits the operator to enter a date on which survey tasks will not be permitted to run on the specified subnet. A display pane 634 lists exclusion dates that have already been entered. Activation of an apply button 636 causes the current date in the exclusion date entry field to be added to administrative database 230. Activation of a delete button 638 causes a selected date in display pane 634 to be deleted making it possible for survey tasks to be performed during that period. Activation of a dismiss button 640 causes exclusive dates window 630 to be dismissed. Activation of a help button 642 causes help information concerning exclusive dates window 630 to be displayed.

Figure 6C:
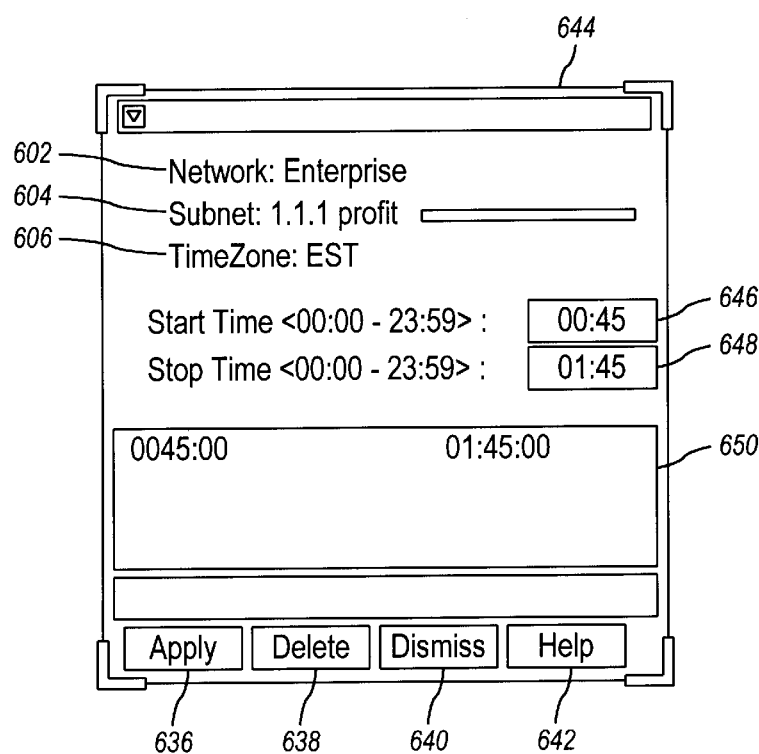

FIG. 6C depicts an exclusive times window 644 corresponding to a particular subnet in accordance with one embodiment of the present invention. Uneditable fields 602, 604, and 606 serve the same functions as the identically designated fields in FIG. 6A. Exclusion start and end time field 646 and 648 permit the operator to enter the start and end times of an exclusion period. A display pane 650 shows previously entered exclusion periods for the subnet. Buttons 636, 638, 640, and 642 serve the same functions as the identically designated buttons of FIG. 6B.

Figures 6D, 7A, 9:
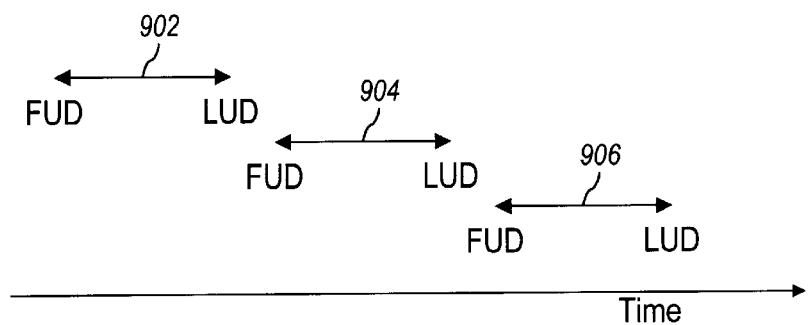

FIG. 6D depicts a portion of a subnet task selection window 650 in accordance with one embodiment of the present invention. Window 650 permits the user to set which survey tasks are to be performed for the subnet through use of task selection checkboxes 652. If a particular task selection checkbox 652 is marked, that indicates that the task is to be performed on the subnet. If the checkbox is not marked, the task is not to be performed on the subnet. When window 650 is first displayed, unmarked checkboxes are inherited from the corresponding window for the network and the remaining checkboxes are marked as a default. The node window (not shown) would similarly inherit unmarked checkboxes from window 650 and leave the remaining checkboxes marked as a default when first displayed.

At the node level, a given task is only performed if the associated checkbox is marked at the node level, subnet level, and network level. This is the default condition. To prevent the task from being performed at the network level, the corresponding checkbox in the network window (not shown) corresponding to subnet task selection window 650 is unmarked. Similarly by unmarking a checkbox in subnet task selection window 650, the corresponding task is excluded from being performed on the subnet regardless of the network setting. Another window would be preferably provided for the node level and allow the user to unmark checkboxes and preclude performance of particular tasks at a particular node. In the preferred embodiment, invocation of asset discovery system 212 can only be specified at the network and subnet level and not at the node level.

The scheduling windows for a particular subnet provided by GUI 204 have been described with reference to FIGS. 6A–6D but similar windows are also provided for individual nodes and the network as a whole. With the inheritance properties described above, GUI 204 permits easy creation of a complex survey schedule for a large network.

It should be noted that the scheduling parameters may specify scheduling information other than repetition periods.

For example, positive scheduling information for a particular time, date, or day of the week may be inherited downward in the hierarchy. Furthermore, this network scheduling system would also be applicable in networks with only two levels of hierarchy where nodes would directly inherit scheduling information from the network as a whole. Still further, this network scheduling system would be applicable in networks with more than two levels of hierarchy with inherited values working their way down through the hierarchy. (For example, subnets may include further subnets which in turn include nodes.)

Asset Database Management

Once survey tasks have been completed, they return their results to asset database 232. Asset database 232 incorporates a special database structure to facilitate management information about network 202. In particular, asset database 232 facilitates easy tracking of node configuration over time. Storage of information in asset database 232 and queries to asset database are preferably managed by a Sybase™ SQL server.

FIGS. 7A–7D depict a database of network management information implemented within asset database 232 in accordance with one embodiment of the present invention. FIG. 7A depicts a system table 700 for storing configuration information about host systems in accordance with one embodiment of the present invention. System table 700 includes a series of records. Each record includes an AALID field 702, a CID field 704, a version field 706, a configuration field 708, an FUD field 710, an LUD field 712, an FUN field 714, and an LUN field 716.

AALID field 702 holds an AALID number which identifies the IP address of the node described by the record through reference to a separate table (not depicted). CID field 704 holds a CID number which uniquely identifies the system operating at the referenced node. Version field 206 includes a version number to distinguish multiple records referring to the same system where each record indicates configuration over a different time period. Configuration field 708 includes configuration information for the identified system as reported by one of asset discovery system 212, SNMP probe system 214, or RPC probe system 216. This configuration information may include the host ID, the host name, product model information, the operating system name, the operating system release, the amount of RAM installed on this system, an SNMP-specific system name, an SNMP-specific system location, an SNMP-specific system contact name, and an SNMP-specific system service.

FUD field 710 holds a time when the configuration information in configuration field 708 was first observed for this system. LUD field 712 holds the last time the configuration information in configuration field 708 was observed to be valid. FUN field 714 identifies which of asset discovery system 212, SNMP probe system 214, or RPC probe system 216 first reported the configuration information in configuration field 708. LUN field 716 identifies which of these network survey systems last reported this configuration information. A change in the contents of configuration field 708 for a given node triggers creation of a new record with a new version number.

FIG. 7B depicts a processors table 720 for storing configuration information about processors of host systems connected to network 202. Each record includes CID field 704, FUD field 710, LUD field 712, FUN field 714, and LUN field 716 as in system table 700. Each record further includes a PathTo field 722 that holds a unique identifier of the processor on the system in standard UNIX device path name format. A configuration field 724 includes a description of the processor. A change in either PathTo field 722 or configuration field 724 represents a change in configuration that triggers creation of a new record.

FIG. 7C depicts a software packages table 726 to track all System V Release 4.0 Application Binary Interface (SVRVABI) packages installed. Each record pertains to a software package installed on a host system of network 202. Each record of software packages table 726 includes CID field 704, FUD field 710, LUD field 712, FUN field 714, and LUN field 716 as in system table 700. Each record further includes an instance field 728 that identifies a software package instance such as Solaris 2.0 packages, SUNWast, SUNWbcp, or SUNWips, and a name field 730 that gives a software package name. A configuration field 732 includes further configuration information identifying a software package category, a hardware architecture supporting the software package, software package version number, a software package installation base directory, a software package vendor, a description of the package, a unique package stamp, a software package installation date, a software package installation status (i.e., completely or partially installed), and the number of blocks of disk space occupied by the package. A change in either instance field 728, name field 730, or configuration field 732 represents a change in configuration that triggers creation of a new record.

FIG. 7D depicts a patches table 734 to track software patches installed on nodes of network 202. Each record pertains to a patch installed on a host system of network 202. Each record of patches table 734 includes CID field 704, FUD field 710, LUD field 712, FUN field 714, and LUN field 716 as in system table 700. A patch ID field 736 holds a patch ID for the patch. A package name field 738 gives a name of the package. A change in either patch ID field 736 or package name field 738 represents a change in configuration that triggers creation of a new record.

A memory table, buses table, peripherals table, and interfaces table (not depicted) are similar to processors table 720. The memory table identifies information about memory configurations of host systems on network 202. For the memory table, PathTo field 722 holds a unique identifier of the memory units on the host system in path name format. The configuration information stored in the memory table includes the amount of memory, the capacity (the sum of currently installed memory and additional memory that could be installed), and textual description of the memory.

The buses table includes information about bus configurations of host systems on network 202. For the buses table, PathTo field 722 holds a unique bus identifier in device path name format. The configuration information stored in the buses table includes a textual bus description.

The peripherals table includes information about individual peripherals on host systems of network 202. PathTo field 722 includes a unique identifier of the peripheral on the system in device path name format. The configuration information stored includes manufacturer and model information of the peripheral, peripheral capacity in Kbytes if applicable, and a textual description of the peripheral.

The interfaces table includes information about the interface devices on host systems of network 202. PathTo field 722 holds the unique identifier of the interface device of the host system in device path name format. The configuration information includes a numerical indicator identifying the type of network interface, e.g, ethernet, token ring, starlan, or fddi, a physical address (MAC) address of the network interface, an IP address of the network interface as retrieved by SNMP probe system 214, a device name of the interface unit, and a description of the interface unit.

Figure 8:
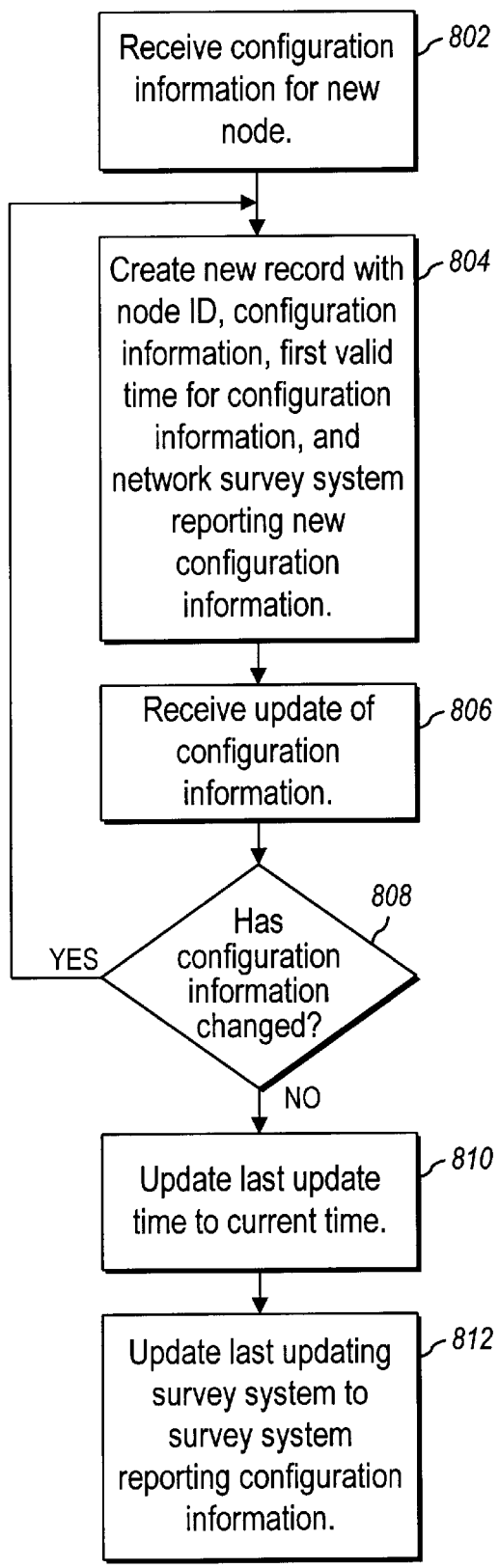
FIG. 8 is a flowchart describing steps of operating a network management information database in accordance with one embodiment of the present invention.

FIG. 8 is a flowchart describing steps of operating a network management information database in accordance with one embodiment of the present invention. The flowchart is described in reference to maintenance of information for a single host system in system table 700, but similar steps are followed in maintaining the other tables described in reference to FIGS. 7B–D. At step 802, asset database 232 receives configuration information for a new node from a network surveying system, e.g., one of asset discovery system 212, SNMP probe system 214, or RPC probe system 216. At step 804, assets database 232 creates a new record for the node in systems table 700. AALID field 702 holds a reference to the IP address for the node and acts as a cross reference between the various tables. CID field 704 includes an identifier for the system. Version field 706 is set to one. Configuration field 708 holds whatever configuration information is received from the network surveying system. FUD field 708 and LUD field 708 are both set to hold the current time. FUN field 714 and LUN field 716 are both set to identify the network surveying system that forwarded the configuration information.

At step 804, asset database 232 receives a further report of configuration information for the system at this node. At step 806, asset database 230 compares the newly received configuration information to the configuration information in the record created at step 802. If the configuration information has changed, step 802 is reexecuted, creating a new record for the new configuration information with the version number one higher than the previous record for the node. If the configuration information has not changed, asset database 232 updates the LUD field to hold the current time at step 808 and the LUN field to identify the network surveying system forwarding the configuration information update and step 810. Then asset database 232 awaits a new configuration information update for the node at step 804.

Thus by examining a series of records for a particular node within system table 700, one can track the system configuration history for each node. For each configuration state, one can identify the time that the configuration was first observed by reference to FUD field 710 and the last time the configuration was observed by reference to LUD 712. Similarly one can identify the first reporting and last reporting network survey systems by reference to FUN field 714 and LUN field 716.

FIG. 9 depicts a representation of the validity periods for configuration information stored in the tables of asset database 230. Three records of system table 700 include configuration information for a particular node at different times. Arrowed lines 902, 904, and 906 depict the time interval for which the configuration information contained in the record is known to be valid. Each valid period begins with the FUD time identified in the record and ends with the LUD time identified in the record. As can be seen the valid time intervals do not overlap.

With appropriate queries to asset database 230 it is simple to resolve many complex configuration management questions. For example, the operator may determine how many host systems have had memory upgrades in the last two months or which nodes need to be upgraded to the latest operating system version. The database structure described above provides asset database 230 with sufficient information to answer such questions but does not waste storage memory space by storing new configuration information that does not indicate a change in configuration.

Automatic Remote Software Installation

Asset discovery system 212 and SNMP probe system 214 rely on standard IP services that have already been installed on hosts 218. However, maximum configuration information capture is achieved by RPC probe system 216. RPC probe system 216 relies on special RPC agents such as RPC software agent 234, RPC hardware agent 226, and RPC AT agent 228. These agents must be installed on hosts 218.

Figure 10:
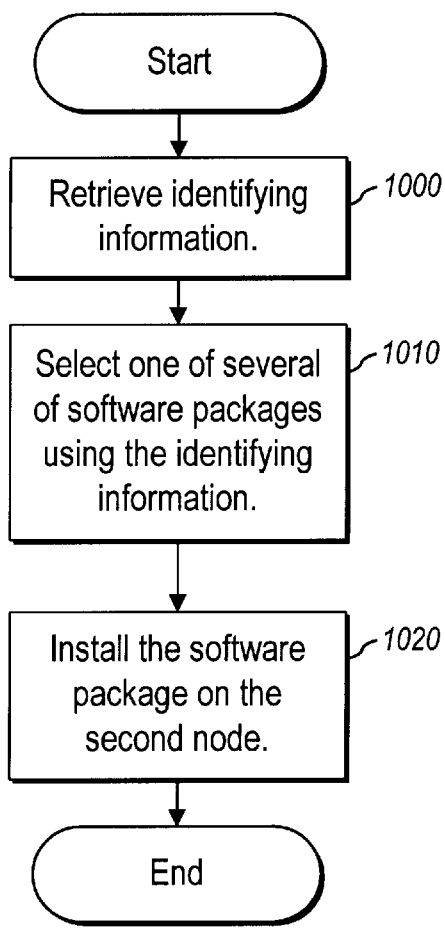
FIG. 10 is a flowchart describing steps of installing a software package according to one embodiment of the present invention.

FIG. 10 illustrates a method for remote software installation in accordance with one embodiment of the present invention. According to this method, a first node in a network (a node running integrated resource 200 in FIG. 2) installs a software package on a second node in the network (one of hosts 218 in FIG. 2). Installation is accomplished by retrieving identifying information and using that information to select the proper software package to install. A module which uses this method is shown as auto-installation system 210 in FIG. 2 and is used to install software packages such as RPC agents. In the system illustrated in FIG. 2, this method can be used to install RPC daemon 222, RPC software agent 224, RPC hardware agent 226 and RPC AT agent 228. Other software packages may also be installed using the method of the present invention, such as operating system patches (which are used to repair defects in an operating system) and user application programs.

At step 1000, the first node retrieves identifying information from a second network node, on which the software package is to be installed. Such information may be retrieved, for example, by remotely executing the uname function on the second node. This may be done using an rexec function, commonly available in UNIX network environments. The rexec function allows a process on a first node in a network to execute a command on a second node in the network and receive the output of that command. At step 1010, the network node installing the software package selects one of several such software packages which reside on the node, using this identifying information. Once a software package has been selected for installation, a copy of the software package is transferred to the second network node. This is shown in step 1020, which also includes the action of installing the software package on the second node. The software package selected will usually include a configuration file. This configuration file will include information needed to properly install the software package. This will typically include information such as the pathname of a destination directory on the second node to which the software package is to be transferred and the name of the installation utility which is to be executed on the second node to actually install the software package.

The identifying information retrieved from the second node generally includes information such as the operating system (OS) name, the OS version and the architecture type (e.g., the second node's make and model). This information is then assembled to form a pathname used to locate the software package on the installing node which is appropriate for the second node. The OS name, OS version and architecture type are concatenated with default information into a string which is then interpreted as a pathname. For example, the software package to be installed might be stored in a directory with the pathname:

... /SRT/AUTOINSTALL/<OS_name>/<OS_version>/
    <architecture_type> where ". . . /SRT/AUTOINSTALL" is the default information (along with slashes throughout the pathname), <OS_name> is the name of the operating system, <OS_version> is the operating system's version and <architecture_type> is the second node's type of architecture. The software package may actually be stored in this directory, or the directory may be a link to the directory in which the software package is actually stored. Creating a link allows access from the linked directory to files stored in the second directory. In one embodiment of the present invention, this technique may be used to reduce storage requirements. Some OS name/OS version/architecture type combinations will use the same software package. Using linked directories, only one copy of a software package need be stored. The pathnames representing systems which use the same software package may thus exist as links to a single directory where the software package actually exists. The software package is thus available in the proper directory, but the storage of multiple copies of the software package is avoided.

Figure 11:
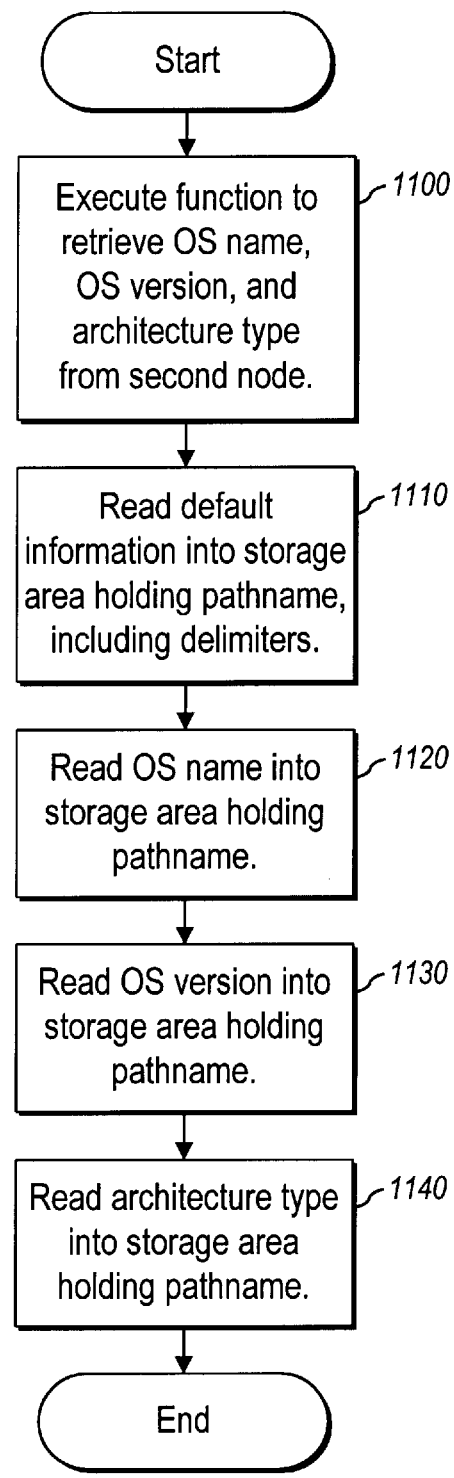
FIG. 11 is a flowchart describing steps of creating a pathname according to one embodiment of the present invention.

The process of forming the pathname is illustrated in FIG. 11. The process begins at step 1100 where a function is executed on the installing node to retrieve identifying information from the second node, such as the second node's OS name, OS version and architecture type. At step 1110, the installing node reads default information into the buffer which is to hold the pathname of the software package. This default information includes delimiters (e.g., slashes (/) or backslashes (\) and basic file location information (e.g., the default directory containing the directories in which the software packages are stored). At step 1120, the OS name retrieved from the second node is read into the pathname buffer. Next, the OS version is read into the pathname buffer at step 1130. At step 1140, the installing node reads the architecture type into the pathname buffer, thereby fully forming the pathname indicating the directory in which the desired software package is stored on the installing node.

Figure 12:
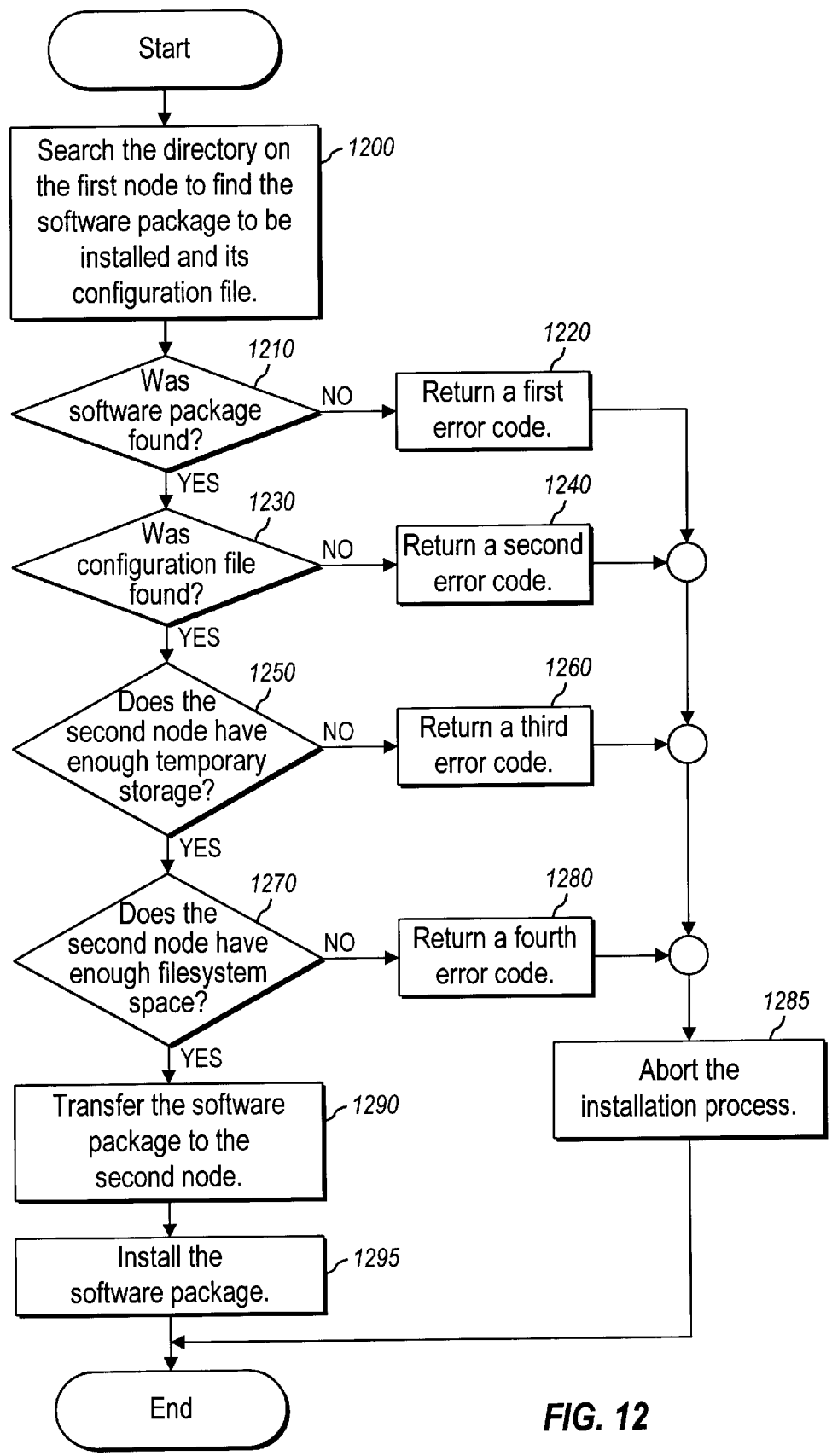
FIG. 12 is a flowchart describing steps of selecting and installing a software package according to one embodiment of the present invention.

The process of selecting a software package (shown as step 1010 in FIG. 10) can be further divided as shown in FIG. 12. At step 1200 of FIG. 12, the directory on the first node containing the software package is searched. This is the directory designated by the pathname created using the process of FIG. 11. In this step the directory is searched to locate the software package to be installed on the second node. Also stored in the directory is a configuration file, as previously described. At step 1210, the system determines whether or not the software package exists in the chosen directory. If no such software package is found, the system returns a first error code at step 1220. An example of this would be a "NO AGENT" error code. If the software package was found, the system determines whether or not a configuration file was found at step 1230. If no such configuration file is found, the system returns a second error code at step 1240. This could also be a "NO AGENT" code, for example. At step 1250, if the configuration file was found, the system determines whether the second node possesses enough temporary storage to permit the installation process to transfer the software package to the second node for installation. This may be done, for example, by remotely executing the df function, which determines the amount of diskspace available in the designated storage system. If the second node does not possess enough temporary storage, the first node returns a third error code at step 1260. An example of this would be a "NO SPACE" error code. At step 1270, if the second node possesses enough temporary storage, the second node's filesystem is examined to determine whether enough storage space exists to permit the software package's installation. In contrast to temporary storage, more storage space is required for the installation of the software package's components in the filesystem than is required to transfer the software package to the second node. The amount of storage space available in the second node's filesystem may also be determined by remotely executing the df function. If the second node does not possess enough storage space in its filesystem to allow the software package to be installed, the first node returns a fourth error code at step 1280. This could also be a "NO SPACE" code, for example. At step 1285, if an error code has been returned the installation process aborts. Step 1285 thus follows any of steps 1220, 1240, 1260 and 1280. If the second node has enough storage space the installation process continues to step 1290. At step 1290, the software package is transferred from the first node to the second node. At step 1295, the software package is installed on the second node by executing the installation utility indicated in the configuration file.

The transfer of the software package need not actually be initiated from the first node. A third node in the network may cause the software package to be transferred from the to the second node. In this embodiment, the third node selects the software package to be transferred and directs the transfer between the first node and the second node. This alternative protocol may find application in the de-installation procedure described next.

Figure 13:
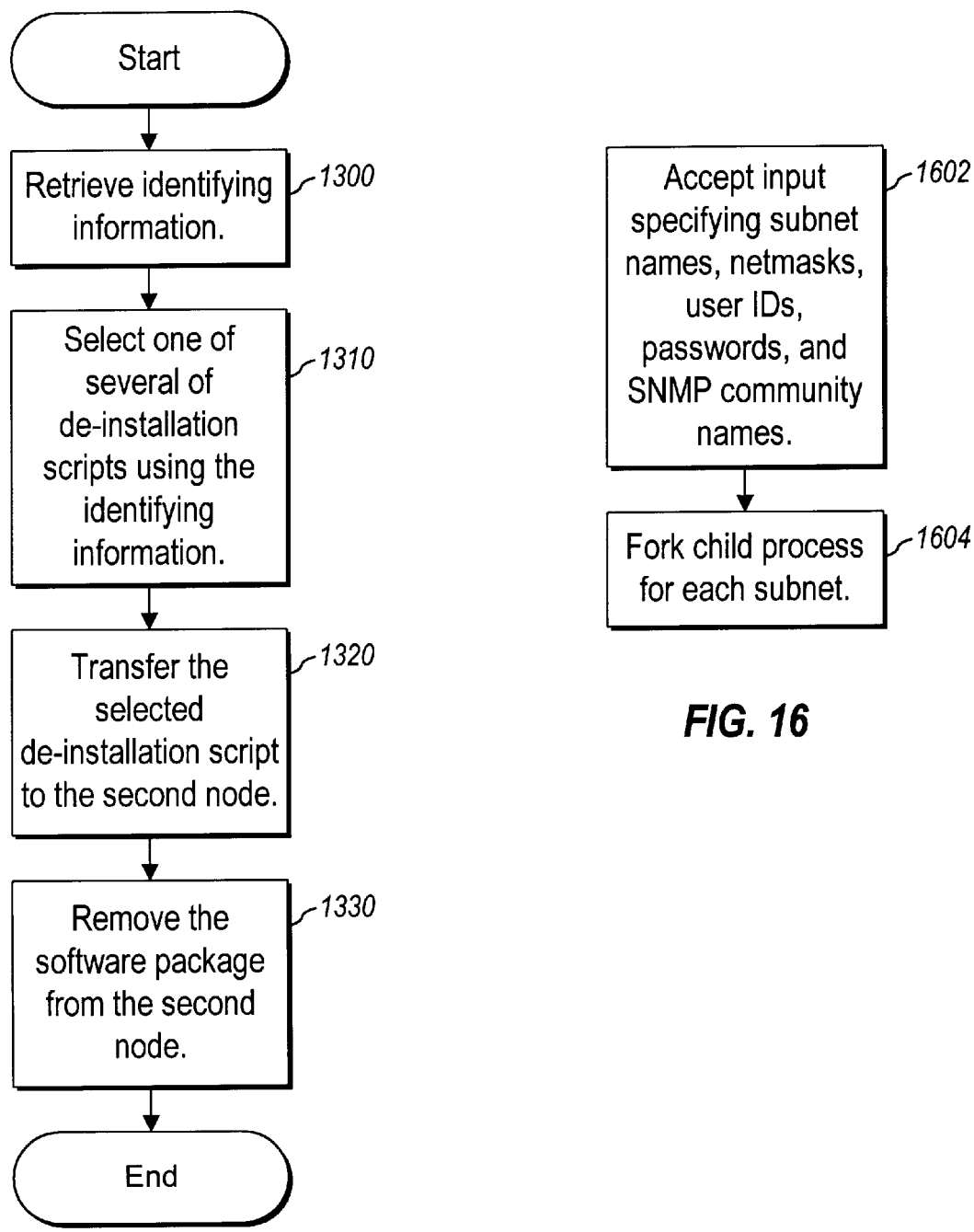
FIG. 13 is a flowchart describing steps of de-installing a software package according to one embodiment of the present invention.

In contrast to the preceding steps for the installation of a software package from a first node onto a second node, the process shown in FIG. 13 describes the steps for de-installing (removing) a previously installed package from the second node. As illustrated in FIG. 13, the process begins at step 1300 by retrieving identifying information from the second node. As previously described, this entails retrieving information such as the OS name, the OS version, and the architecture type from the second node. In a manner similar to that previously described for selecting a software package to install, the first node selects one of several de-installation scripts using this identifying information at step 1310. The selected de-installation script is then transferred to the second node at step 1320. At step 1330, the software package residing on the second node is removed by executing the de-installation script.

Figure 14:
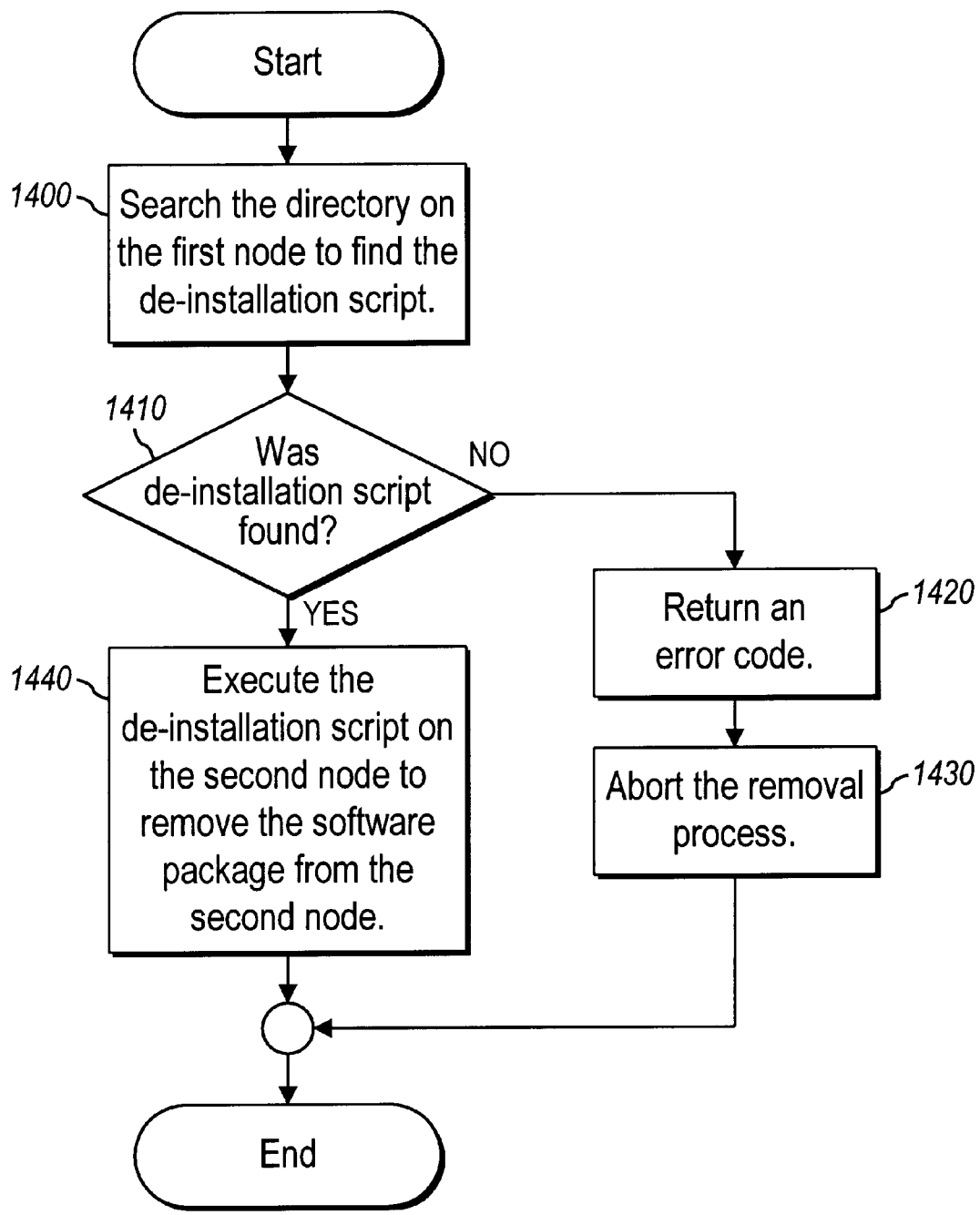
FIG. 14 is a flowchart describing steps of selecting and executing a de-installation script according to one embodiment of the present invention.

FIG. 14 shows the steps taken in selecting and executing the de-installation script. At step 1400 the directory identified by the pathname previously created is searched to locate the proper de-installation script. At step 1410, the first node determines whether a de-installation script was found. If no such script is found, an error code is returned (step 1420) and the de-installation process aborted (step 1430). If the proper de-installation script was found, the first node causes the de-installation script to be executed on the second node at step 1440. The execution of the de-installation script causes the removal of the software package files from the second node.

Asset Discovery System

Asset discovery system 212 preferably performs network survey tasks in response to commands from ProcLoad module 306. In an alternative embodiment, asset discovery system 212 is a stand-alone system invoked by direct user control. The stand-alone embodiment does not provide the sophisticated scheduling and database capabilities proved by integrated resource 200.

Figure 15:
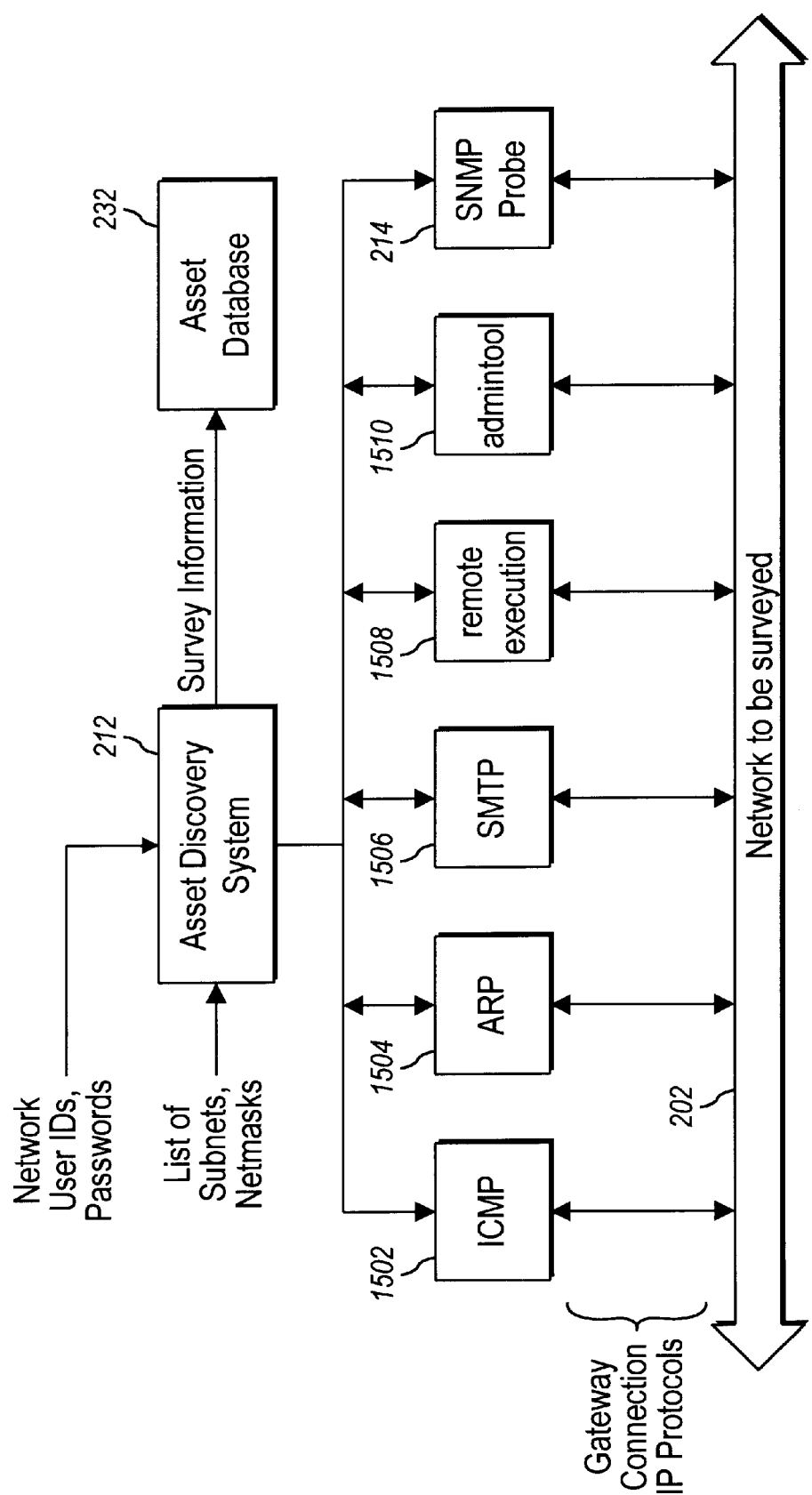
FIG. 15 depicts a simplified representation of the services used by an asset discovery system in accordance with one embodiment of the present invention.

FIG. 15 depicts a simplified representation of the services used by asset discovery system 212 in accordance with one embodiment of the present invention. The input to asset discovery system 212 includes a list of subnets of network 202 to be surveyed with the netmask for each subnet. Further input may include network user IDs, passwords, and SNMP community names for network 202. Once the survey is complete, survey information is transferred to asset database 232. In the stand-alone context, a separate database substitutes for asset database 232.

Asset discovery system 212 takes advantage of various services available to interface with network 202. These include an ICMP (Internet Control Message Protocol) service 1502, an ARP (Address Resolution Protocol) service

1504, an SMTP (Simple Mail Transfer Protocol) service 1506, and a remote execution service 1508 as implemented by the well-known rexec() command. These services are particularly useful because they access complementary services implemented at the nodes which are often available because they serve functions unrelated to network management. Also, there is an Admintool service 118 useful in surveying Solaris-based systems. Asset discovery system 212 also accesses SNMP probe system 214. For stand-alone applications, at least some of the functionality of SNMP probe system 214 is provided as an adjunct to asset discovery system 212.

The following documents are protocol specifications describing some of the services depicted in FIG. 15.

Case, J., et al., "A Simple Network Management Protocol; RFC 1157" *Internet Request for Comments*, no. 1157, May 1990.

McCloghrie, K., "Management Information Base for Network Management of TCP/IP-based internets; RFC 1156" *Internet Request for Comments*, no. 1156, May 1990.

Pummer, D., "An Ethernet Address Resolution Protocol; RFC 826" *Internet Request for Comments*, no. 826, November 1982.

Postel, J., "Internet Control Message Protocol; RFC 792" *Internet Request for Comments*, no. 792, September 1981.

Postel, J. "Simple Mail Transfer Protocol; RFC 821" Internet *Request for Comments*, no. 821, August 1982.

The contents of these specifications are incorporated herein by reference for all purposes.

A typical step in the surveying process is to invoke one of the services shown in FIG. 15 to send a message directed to a particular address via network 202. The service receives a reply to the message including node equipment or configuration information. Asset discovery system 212 extracts this information from the reply and the message exchange is repeated for each IP address in the range or ranges to be surveyed. The extracted information is stored in assets database 232. Many messages involve accessing standard TCP/IP services.

Preferably, these messages are sent to each node individually rather than by broadcasting. In this way, other applications using network 202 or portions thereof do not experience a sudden performance-degrading increase in network traffic.

The various services exploited by asset discovery system 212 provide a range of capabilities in collecting information from network nodes. Certain configuration and/or equipment information will be available by use of some services and not from others. Furthermore some services are especially useful in returning information from particular types of equipment. For example SMTP service 1506 and remote execution service 1508 are useful in extracting information from UNIX systems. Admintool service 1510 is useful in extracting information from Solaris 2.x systems. SNMP probe system 214 is useful in returning information from both UNIX and non-UNIX systems, even systems such as printers, bridges, routers, etc. ICMP service 1502 can at least verify the presence of any entity operating in accordance with the TCP/IP protocol.

FIG. 16 depicts a flowchart describing steps of surveying a network in accordance with one embodiment of the present invention. The depicted steps are steps of an asset survey tool parent process. At step 1602, asset discovery system 212 accepts information specifying characteristics of the network survey to be performed. This information includes the addresses of subnets to be surveyed as well as a netmask for each subnet. This information further includes network user IDs and corresponding passwords to allow remote access to nodes on network 202 and SNMP read community names needed for access to management information stored at the nodes on network 202. Each subnet may include more than one domain with distinct network user IDs, passwords, and SNMP read community names. In the context of integrated resource 200, this information may be entered via GUI 204.

Note that the user ID, password, and SNMP community name information is not essential but the greater the access available to asset discovery system 212, the more information that may be obtained. Preferably, there should be a networkwide user ID and password. An operator may specify the information directly on a command line or by reference to files. At step 1604, a child process for each subnet to be surveyed is spawned. These child processes run concurrently.

Figure 17A:
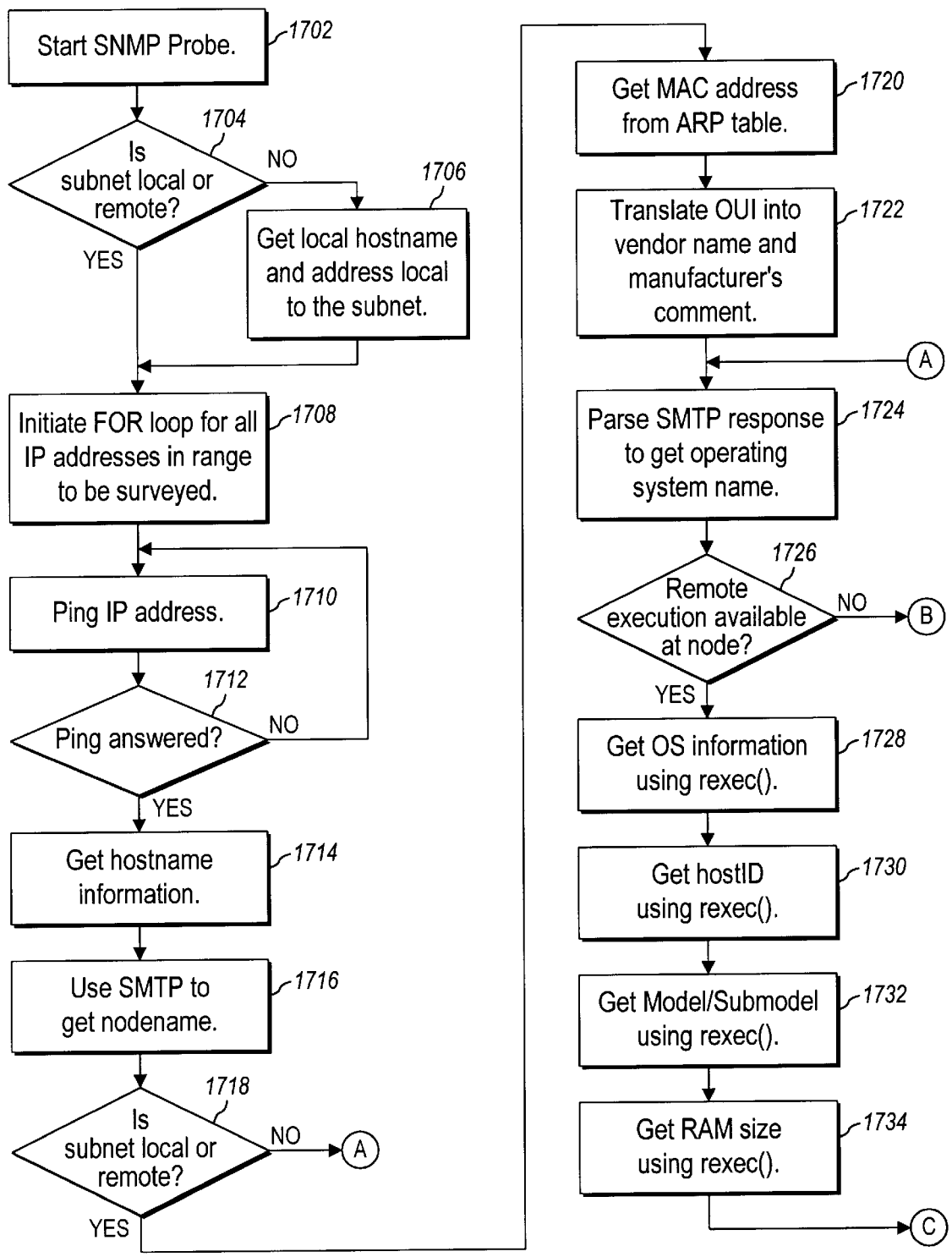
FIGS. 17A–B depict a flowchart describing steps of surveying a particular subnet in accordance with one embodiment of the present invention.
Figure 17B:
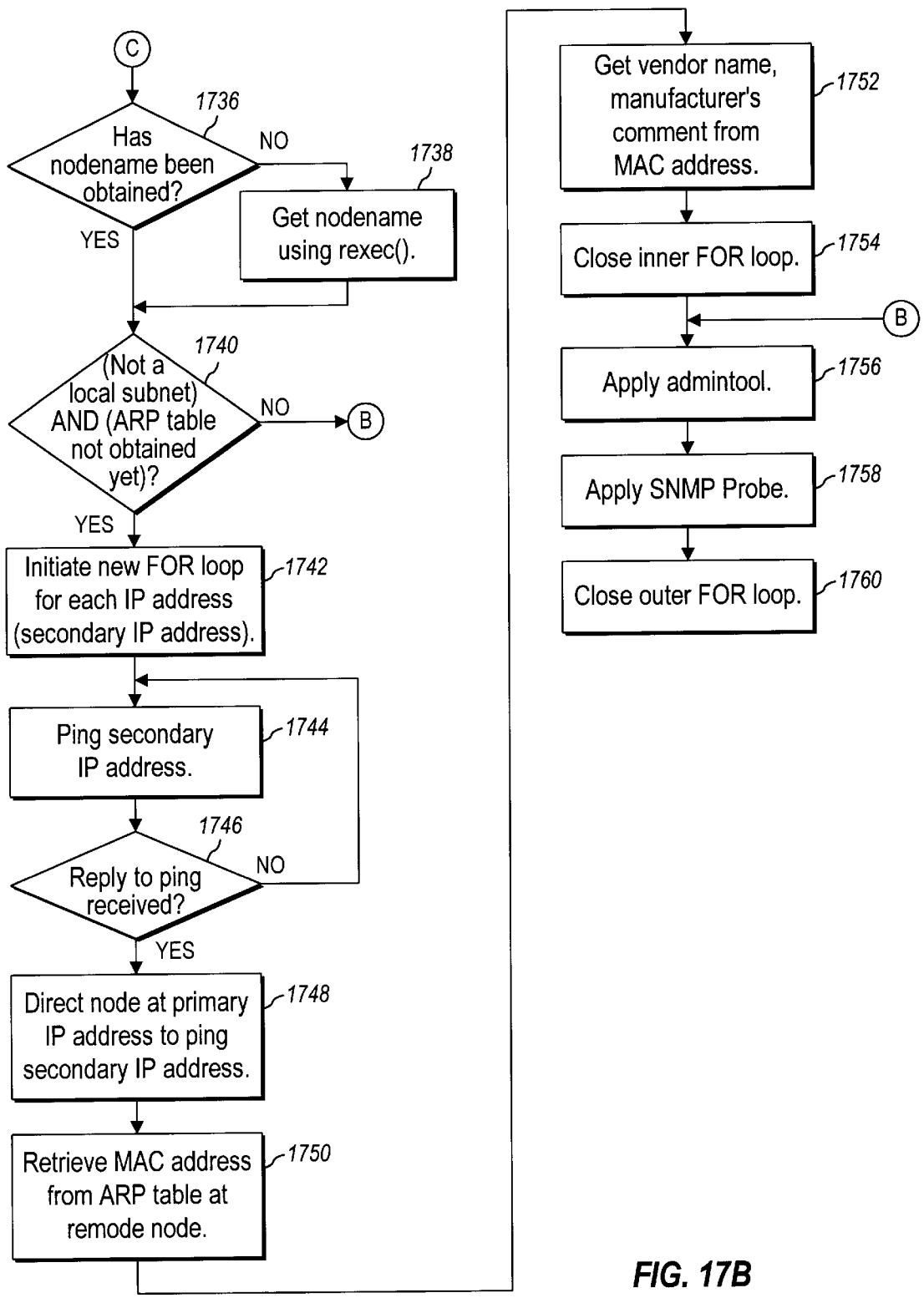

FIGS. 17A–B depict a flowchart describing steps of surveying a particular subnet in accordance with one embodiment of the present invention. The depicted steps are performed by the child process spawned at step 204 to survey the particular subnet. At step 1702, the child process starts an SNMP probe process which is explained below with reference to FIG. 18. At step 1704, the child process determines whether the subnet is local or remote. A local subnet is one to which the system running asset discovery system 212 is connected. A remote subnet is one other than the one to which this system is connected. If the subnet is not local, at step 1706, the child process gets a hostname and address local to the subnet using the gethostbyaddr() UNIX command which accesses a network naming service. The gethostbyaddr() UNIX command points to a data structure that includes the host name of the node's IP address. Asset discovery system 212 extracts the host name from this data structure.

At step 1708, the child process begins a FOR loop that repeats for every IP address in the range to be surveyed. At step 1710, a ping command is invoked for the current IP address. The ping command relies on ICMP service 1502. At step 1712, the child process determines whether there was a response from the pinged IP address. If there was no response, pinging continues at step 1710 for the next IP address.

If a ping response is received, at step 1714, the child process uses gethostbyaddr() to obtain the hostname of the pinged node using its IP address as an input. At step 1716, the child process invokes SMTP service 1506 to access the current node with an SMTP HELO command. The response to the HELO command is parsed to extract the nodename by using parsing techniques known to those of skill in the art. The hostname obtained in this way will be considered to be more accurate than the one retrieved by the gethostbyaddr() command. Accordingly, if the invocation of SMTP service 1506 is successful, the hostname it obtains replaces the hostname determined at step 1706. Of course, some nodes are not equipped to respond to SMTP commands and for these nodes the hostname determined at step 1706 will remain valid.

Step 1718 is another decision point where further execution depends on whether the current subnet is local or remote from the system running asset discovery system 212. If the subnet is local, at step 1720, the child process retrieves the MAC address of the currently examined node from the ARP table operated by ARP service 1504 at the system running at asset discovery system 212. This MAC address should be available because a natural consequence of the pinging process is that the ARP table maintained by ARP process 110 is updated to include entries for each node pinged where there is a host that responds to ARP broadcast messages and is on the same subnet as the host running asset discovery system 212.

As known to those of skill in the art, the first three bytes of the MAC address represent an Object Unit Identifier (OUI). At step 1722, the child process translates the OUI into a vendor name and manufacturer's comment for the node. For UNIX systems, the vendor name and manufacturer's comment identify the host system. For Intel architecture systems, the vendor name and manufacturer's comment identify the network interface card.

If the subnet is determined to be remote at step 1718, steps 1720 and 1722 are skipped. For either local or remote subnets, at step 1724, the child process further parses the response from the SMTP command of step 1716 to obtain the name of the operating system operating at the responding host. In an alternative embodiment, a new SMTP HELO command is sent out at this step to obtain the operating system name.

The next series of steps apply remote execution service 1508 to invoke available operating system commands at the examined node that provide information of interest. At step 1726, the child process determines whether remote execution is available at the remote node. This is done by attempting to remotely execute a command that simply sends an acknowledgement message back to asset discovery system 212.

If remote execution is determined to be available, at step 1728, the child process uses remote execution service 1508 to execute an rexec() command that causes the examined node to determine the name of its operating system and report it back to asset discovery system 212. The particular command to be invoked at the examined node will depend on the operating system identified at step 1724. If an operating system name is successfully obtained at step 1728, it replaces the one obtained at step 1724.

Similarly, at step 1730, the rexec() command is executed to obtain the host ID at the examined node. Again, the particular command remotely executed depends on the operating system at the remote node. The model/submodel is obtained in this way at step 1732 and the RAM size at step 1734.

At step 1736, the child process determines if the nodename has already been obtained at this point. If it has not been obtained, rexec() is applied as before to obtain the nodename at step 1738.

At step 1740, further execution depends on whether both 1) the current subnet is not local and 2) the ARP table is not yet available from a previous iteration of the FOR loop beginning at step 1708. If both conditions are true, the child process will perform additional steps to obtain the ARP table. Typically, the reason the ARP table is unavailable for remote subnets is that translation between the IP address and the MAC address does not occur at the host running asset survey tool 212 but rather at a different host, causing the ARP table to be updated at that host. A solution to this problem provided by the present invention is to develop an ARP table at that host by remotely executing ping commands from there.

Step 1742 begins a new FOR loop for every IP address in the range to be surveyed. In the steps that follow, the primary IP address will be considered to be the IP address currently examined by the FOR loop beginning at step 1708 and the secondary IP address will be considered to be the IP address currently examined by the FOR loop beginning at step 1742.

At step 1744, the child process pings the node at the current secondary IP address applying ICMP service 1502. Step 1746 determines whether the ping of step 1744 has been successful. If the ping of step 1744 has been successful, at step 1748, the child process accesses remote execution service 1508, issuing an rexec() command to direct the host at the primary address to ping the host at the secondary address. At step 1750, the child process retrieves the MAC address from the ARP table at the primary IP address if available there. At step 1752, the child process translates the OUI into a vendor name and manufacturer's comment for the node at the secondary address. If step 1746 determines that the ping of step 1744 did not receive a response, the next secondary address is pinged at step 1744. Step 1754 closes the FOR loop opened at step 1742. For non-local subnets, the FOR loop from step 1742 to step 1754 may only need to run through all the secondary IP addresses once as soon as a primary IP address able to accommodate remote execution and maintain an ARP table is reached in iterating through the FOR loop beginning at step 1708.

Step 1756 follows either 1) step 1754, 2) a determination at step 1726 that remote execution is unavailable at the currently examined node, or 3) a determination at step 1740 that either a local subnet is being examined or the ARP table has already been obtained. At step 1756, the child process invokes admintool service 1510 to obtain information not yet obtained from the previous steps. Particularly, admintool service 1510 will obtain the hostname OS name, OS version, and hostID of the currently examined node if not previously obtained and available. Admintool service 1510 is designed to operate to access a special network interface of Solaris systems.

At step 1758, the child process attempts to fill in remaining gaps in the information about the currently examined node by invoking SNMP probe system 214 which was started at step 1702. SNMP probe system 214 will retrieve the OS name, OS version, hostID, Model/Submodel, RAM size, MAC address, vendor name, and hostname if available for the examined node and not previously obtained. The operation of SNMP probe system 214 is explained with reference to FIG. 18. At step 1760, the FOR loop begun at step 1702 closes, ending the examination of a node at a particular IP address.

SNMP Probe

Figure 18:
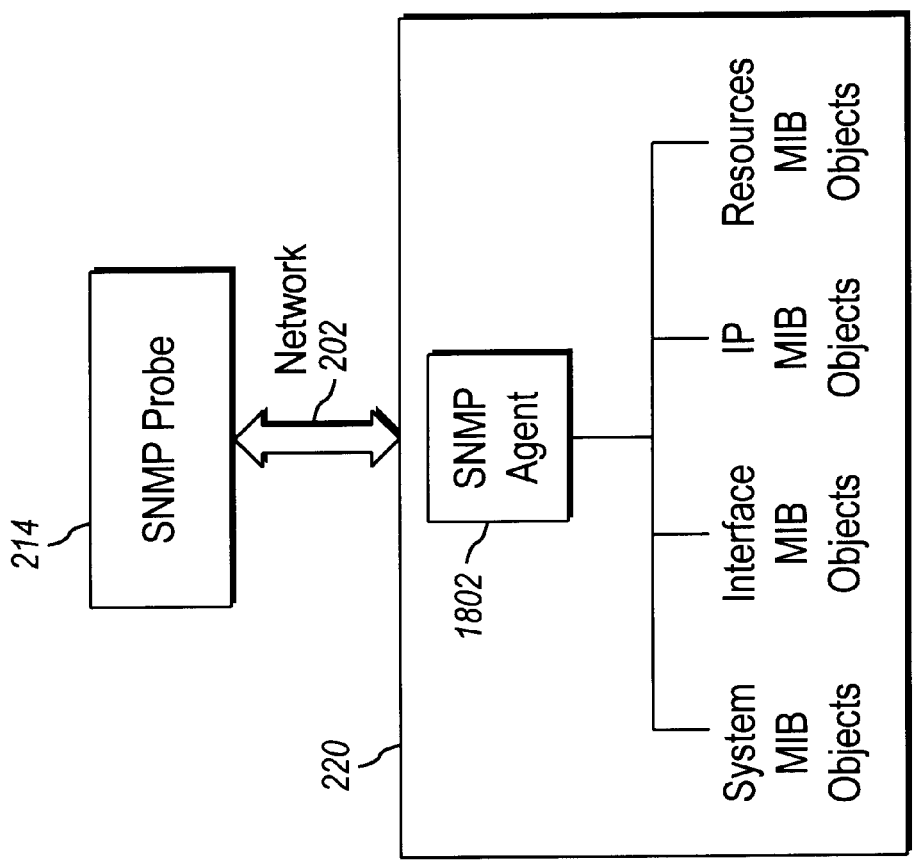
FIG. 18 depicts the operation of an SNMP probe system in accordance with one embodiment of the present invention.

FIG. 18 depicts the operation of SNMP probe system 214 in accordance with one embodiment of the present invention. SNMP probe system 214 may receive commands directly from task scheduler 302 or from asset discovery system 212 as described above. A portion of the functionality of SNMP probe system 214 is incorporated in stand-alone embodiments of asset discovery system 212.

SNMP probe system 214 operates to retrieve the values of so-called MIB (Management Information Base) objects from hosts of network 202 such as example host 220. These objects store network management information at many hosts including bridges, routers, printers, etc. Hosts maintaining these objects incorporate an SNMP agent 1802 capable of responding to authorized requests for MIB object values from requesters having the correct SNMP community name.

In response to a request from task scheduler 302 or asset discovery system 212, SNMP probe system 214 generates a series of requests for MIB object values and sends them to SNMP agent 1802. SNMP agent 1802 retrieves the object value from a local MIB database 1804. SNMP agent 1802 then sends messages back to SNMP probe system 214 including the requested MIB object value. SNMP probe system 214 then extracts the information requested by task scheduler 302 or asset discovery system 212 and make it available for storage in assets database 232. SNMP probe system 214 thus contributes to the development of assets database 232 as a repository of information about current assets at the nodes of network 202 as well as historical information about these assets.

Preferably, SNMP probe system 214 retrieves information from the following MIB objects:

System Group:

sysDescr: A description of the device. This value may include the full name and version identification of the system's hardware type, software operating system, and networking software.

syscontact: The name of a contact person for the device together with contact information for this person.

sysName: The hostname of the device.

sysLocation: The physical location of the device.

sysservices: The network management services offered by the device as defined by the SNMP standard.

sysObjectID: An vendor-generated identification of the type of system.

Interfaces Group:

This group of objects characterizes network interfaces on systems accessible to network 202.

ifType: An identifier characterizing the type of interface. (Ethernet, starLAN, FDDI, x.25, etc.)

ifDescr: A description of the interface.

ifPhysAddress: The physical address of the interface.

IP Group:

ipAdEntIfIndex:An index value which uniquely identifies an interface.

Resources Group:

This group of MIB objects characterizes storage on systems of network 202.

hrStorageTypes: An identifier indicating the type of storage, e.g, RAM, virtual memory, fixed disk, removable disk, floppy disk, or unknown.

hrStorageSize: The number of Mbytes of storage on the device.

hrStorageUsed: The number of Mbytes of storage in use.

hrStorageAllocation Units: The size of storage units on the device.

hrSMemorySize: The memory size of the device.

hrSWRunName: The title of a program running on the system.

When asset discovery system 212 invokes SNMP probe system 214 at step 1758, depending on the information not yet obtained through previous steps, it may request the OS name, OS version, hostID, Model/Submodel, RAM size, MAC address, vendor name, and/or hostname. The OS name, OS version, Model/Submodel, vendor name, and host ID are obtained by requesting the value of the sysDescr object for the currently monitored node. To extract the needed data from the sysDescr object, SNMP probe system uses standard parsing techniques, matching the text value of the object to standard formats used by various known types of hardware. The RAM size comes from the hrSMemorySize object. The hostname comes from the sysName object. The MAC address comes from the ifPhysAddr object.

Task scheduler 302 invokes SNMP probe system 214 to retrieve the other data in the objects listed above. Of course, the objects listed above are presented merely as preferred examples. SNMP probe system 214 may not retrieve values of all the objects listed above or may retrieve the values of other objects. The portion of SNMP probe system 214 included with stand-alone versions of asset survey tool 214 preferably accesses values of the sysDescr, hrSMemorySize, sysName, and ifPhysAddr objects.

The invention has now been explained with reference to specific embodiments. Other embodiments will be apparent to those of ordinary skill in the art in view of the foregoing description. It is therefore not intended that this invention be limited except as indicated by the appended claims and their full scope of equivalents.

What is claimed is:

1. A computer-implemented method for surveying a network comprising the steps of:

sending a plurality of SNMP variable value requests via said network, each of said plurality of requests addressed to a different address in a range of address space;

receiving a plurality of replies to said plurality of requests, each of said replies originating from a different address in said range;

extracting information from each of said replies, said information characterizing assets at said nodes receiving said plurality of messages and generating said replies, wherein said extracting step comprises parsing said replies to extract information identifying equipment of said receiving nodes; and developing from said extracted information an asset database characterizing a current configuration of assets at said nodes generating said replies.

2. The method of claim 1 wherein said extracting step comprises:

parsing said replies to extract nodenames of said receiving nodes.

3. The method of claim 1 wherein said extracting step comprises:

parsing said replies to extract information identifying operating system versions operating on equipment of said receiving nodes.

4. The method of claim 1 wherein said variable value requests request values associated with MIB objects.

5. The method of claim 4 wherein said MIB objects are sysDescr objects.

6. The method of claim 4 wherein said MIB objects are sysName objects.

7. The method of claim 4 wherein said MIB objects are ifPhysAddress objects.

8. The method of claim 1 wherein said network is a TCP/IP network and said address space is an IP address space.

9. A computer program product for surveying a network comprising:

code for sending a plurality of SNMP variable value requests via said network, each of said plurality of requests addressed to a different address in a range of address space;

code for receiving a plurality of replies to said plurality of requests, each of said replies originating from a different address in said range;

code for extracting information from each of said replies, said information characterizing nodes receiving said plurality of messages and generating said replies, wherein said code for extracting information comprises code that parses said replies to extract information identifying equipment of said receiving nodes;

code for developing from said extracted information an asset database characterizing a current configuration of assets at said nodes generating said replies; and a computer-readable medium for storing said codes.

10. The product of claim 9 wherein said extracting code comprises:

code for parsing said replies to extract nodenames of said receiving nodes.

11. The product of claim 9 to wherein said extracting code comprises:

code for parsing said replies to extract information identifying operating system versions operating on equipment of said receiving nodes.

12. The product of claim 9 wherein said variable value requests request values associated with MIB objects.

13. The product of claim 12 wherein said MIB objects are sysDescr objects.

14. The product of claim 12 wherein said MIB objects are sysName objects.

15. The product of claim 12 wherein said MIB objects are ifPhysAddress objects.

16. The product of claim 9 wherein said network is a TCP/IP network and said address space is an IP address space.

17. A computer system configured to survey a network by virtue of being configured to:

send a plurality of SNMP variable value requests via said network, each of said plurality of requests addressed to a different address in a range of address space;

receive a plurality of replies to said plurality of requests, each of said replies originating from a different address in said range;

extract information from each of said replies, said information characterizing nodes receiving said plurality of messages and generating said replies;

parse said replies to extract information identifying, equipment of said receiving nodes; and develop from said extracted information an asset database characterizing a current configuration of assets at said nodes generating said replies.

18. A computer network comprising a plurality of nodes, including a network management station configured to survey a network by virtue of being configured to:

send a plurality of SNMP variable value requests via said network, each of said plurality of requests addressed to a different address in a range of address space;

receive a plurality of replies to said plurality of requests, each of said replies originating from a different address in said range;

extract information from each of said replies, said information characterizing nodes receiving said plurality of messages and generating said replies;

parse said replies to extract information identifying equipment of said receiving nodes; and develop from said extracted information an asset database characterizing a current configuration of assets at said nodes generating said replies.

* * * * *